United States Patent
Pita et al.

(10) Patent No.: US 7,620,534 B2
(45) Date of Patent: Nov. 17, 2009

(54) SOUND ENABLING COMPUTERIZED SYSTEM FOR REAL TIME RESERVOIR MODEL CALIBRATION USING FIELD SURVEILLANCE DATA

(75) Inventors: Jorge A. Pita, Dhahran (SA); Ali H. Dogru, Dhahran (SA); Nabil M Al-Zamel, Dhahran (SA)

(73) Assignee: Saudi Aramco, Dhahran (SA)

( * ) Notice: Subject to any disclaimer, the term of this patent is extended or adjusted under 35 U.S.C. 154(b) by 644 days.

(21) Appl. No.: 11/414,566

(22) Filed: Apr. 28, 2006

(65) Prior Publication Data

US 2007/0255500 A1    Nov. 1, 2007

(51) Int. Cl.
*G06F 7/48* (2006.01)
(52) U.S. Cl. .................. 703/10; 703/2; 702/7; 702/13; 702/48; 702/54; 702/187; 702/189; 700/30; 700/31
(58) Field of Classification Search .............. 703/2, 703/6, 9, 10; 702/6–14, 16, 45, 48, 50, 54, 702/187, 189; 434/6, 10, 126; 706/16, 21, 706/22; 700/28–31
See application file for complete search history.

(56) References Cited

U.S. PATENT DOCUMENTS

| | | | |
|---|---|---|---|
| 5,049,079 A | * | 9/1991 | Furtado et al. ............... 434/253 |
| 7,526,418 B2 | | 4/2009 | Pita et al. |
| 2005/0209836 A1 | * | 9/2005 | Klumpen et al. ............... 703/10 |

OTHER PUBLICATIONS

Zheng et al., Y. Simultaneous Measurement of Gas and Solid Holdups in Multiphase Systems Using Ultrasonic Technique, Sciencedirect, Chemical Engineering Science, vol. 59, Iss. 17, Sep. 2004, pp. 3505-3514.*

A.H. Dogru, et al., "A Massively Parallel Reservoir Simulator For Large Scale Reservoir Simulation", SPE 51886, Feb. 1999 SPE Reservoir Simulation Symposium.

A.H. Dogru, et al., "Simulation of Super K Behavior in Ghawar by a Multi-Million Cell Parallel Simulator", SPE68066, Mar. 2001, Middle East Oil Show, Bahrain.

* cited by examiner

*Primary Examiner*—Russell Frejd
(74) *Attorney, Agent, or Firm*—Bracewell & Giuliani LLP

(57) ABSTRACT

A computer-based system generates digital and audio responses to changes in fluid and rock properties of a producing hydrocarbon reservoir for surveillance analysis. The system calibrates observed changes against directly-measured field data in order to optimize the reservoir model. The changes may include, for example, stress changes in rock, impedance changes in rock, and fluid density changes.

101 Claims, 19 Drawing Sheets

Pressure Display

Pressure Display Between Layers

Self-Organizing Map

Fracture Gradient
Related to Micro-Seismic Monitoring

Horizontal Stress
Related to Micro-Seismic Monitoring

Bulk Density
Related to Borehole Gravimetry

Uniaxial Compaction
Related to Micro-Seismic Monitoring $t_1$

| P: 5500<br>O: 0.6<br>W: 0 | P: 5500<br>O: 0.69<br>W: 0 | P: 5500<br>O: 0.7<br>W: 0 | P: 5500<br>O: 0.72<br>W: 0 | P: 5500<br>O: 0.63<br>W: 0 |
|---|---|---|---|---|
| P: 5500<br>O: 0.62<br>W: 0 | P: 5000<br>O: 0.78<br>W: 0 | P: 5000<br>O: 0.85<br>W: 0 | P: 5000<br>O: 0.86<br>W: 0 | P: 5500<br>O: 0.65<br>W: 0 |
| P: 5500<br>O: 0.65<br>W: 0 | P: 5000<br>O: 0.75<br>W: 0 | WELL | P: 5000<br>O: 0.86<br>W: 0 | P: 5500<br>O: 0.67<br>W: 0 |
| P: 5500<br>O: 0.6<br>W: 0 | P: 5000<br>O: 0.78<br>W: 0 | P: 5000<br>O: 0.8<br>W: 0 | P: 5000<br>O: 0.82<br>W: 0 | P: 5500<br>O: 0.62<br>W: 0 |
| P: 5500<br>O: 0.57<br>W: 0 | P: 5500<br>O: 0.68<br>W: 0 | P: 5500<br>O: 0.76<br>W: 0 | P: 5500<br>O: 0.77<br>W: 0 | P: 5500<br>O: 0.6<br>W: 0 |

| P: 5500<br>O: 0.6<br>W: 0 | P: 5500<br>O: 0.69<br>W: 0 | P: 5500<br>O: 0.7<br>W: 0 | P: 5500<br>O: 0.72<br>W: 0 | P: 5500<br>O: 0.63<br>W: 0 |
|---|---|---|---|---|
| P: 5500<br>O: 0.62<br>W: 0 | P: 5000<br>O: 0.78<br>W: 0 | P: 5000<br>O: 0.85<br>W: 0 | P: 5000<br>O: 0.86<br>W: 0 | P: 5500<br>O: 0.65<br>W: 0 |
| P: 5100<br>O: 0.65<br>W: 0 | P: 4800<br>O: 0.75<br>W: 0 | WELL | P: 5000<br>O: 0.86<br>W: 0 | P: 5500<br>O: 0.67<br>W: 0 |
| P: 5300<br>O: 0.6<br>W: 0 | P: 4850<br>O: 0.78<br>W: 0 | P: 4780<br>O: 0.8<br>W: 0 | P: 5000<br>O: 0.82<br>W: 0 | P: 5500<br>O: 0.62<br>W: 0 |
| P: 5250<br>O: 0.57<br>W: 0 | P: 5200<br>O: 0.68<br>W: 0 | P: 5500<br>O: 0.76<br>W: 0 | P: 5500<br>O: 0.77<br>W: 0 | P: 5500<br>O: 0.6<br>W: 0 |

| P: 5500 O: 0.6 W: 0 | P: 5500 O: 0.69 W: 0 | P: 5500 O: 0.7 W: 0 | P: 5500 O: 0.72 W: 0 | P: 5500 O: 0.63 W: 0 |
|---|---|---|---|---|
| P: 5500 O: 0.62 W: 0 | P: 5000 O: 0.78 W: 0 | P: 5000 O: 0.85 W: 0 | P: 5000 O: 0.86 W: 0 | P: 5500 O: 0.65 W: 0 |
| P: 5000 O: 0.65 W: 0.07 | P: 4750 O: 0.75 W: 0 | WELL | P: 5000 O: 0.86 W: 0 | P: 5500 O: 0.67 W: 0 |
| P: 5300 O: 0.6 W: 0 | P: 4800 O: 0.78 W: 0 | P: 4750 O: 0.8 W: 07 | P: 5000 O: 0.82 W: 0 | P: 5500 O: 0.62 W: 0 |
| P: 5200 O: 0.57 W: 0.09 | P: 5150 O: 0.68 W: 0 | P: 5500 O: 0.76 W: 0 | P: 5500 O: 0.77 W: 0 | P: 5500 O: 0.6 W: 0 |

| P: 5500 O: 0.6 W: 0 | P: 5500 O: 0.69 W: 0 | P: 5500 O: 0.7 W: 0 | P: 5500 O: 0.72 W: 0 | P: 5500 O: 0.63 W: 0 |
|---|---|---|---|---|
| P: 5500 O: 0.62 W: 0 | P: 5000 O: 0.78 W: 0 | P: 5000 O: 0.85 W: 0 | P: 5000 O: 0.86 W: 0 | P: 5500 O: 0.65 W: 0 |
| P: 5000 O: 0.65 W: 0.07 | P: 5000 O: 0.75 W: 0 | WELL | P: 5000 O: 0.86 W: 0 | P: 5500 O: 0.67 W: 0 |
| P: 5500 O: 0.6 W: 0 | P: 5000 O: 0.78 W: 0 | P: 5000 O: 0.8 W: 0 | P: 5000 O: 0.82 W: 0 | P: 5500 O: 0.62 W: 0 |
| P: 5500 O: 0.57 W: 0.0 | P: 5550 O: 0.68 W: 0 | P: 5500 O: 0.76 W: 0 | P: 5500 O: 0.77 W: 0 | P: 5500 O: 0.6 W: 0 |

| P: 5500<br>O: 0.6<br>W: 0 | P: 5500<br>O: 0.69<br>W: 0 | P: 5500<br>O: 0.7<br>W: 0 | P: 5500<br>O: 0.72<br>W: 0 | P: 5500<br>O: 0.63<br>W: 0 |
|---|---|---|---|---|
| P: 5500<br>O: 0.62<br>W: 0 | P: 5000<br>O: 0.78<br>W: 0 | P: 5000<br>O: 0.85<br>W: 0 | P: 5000<br>O: 0.86<br>W: 0 | P: 5500<br>O: 0.65<br>W: 0 |
| P: 5100<br>O: 0.65<br>W: 0 | P: 4800<br>O: 0.75<br>W: 0 | WELL | P: 5000<br>O: 0.86<br>W: 0 | P: 5500<br>O: 0.67<br>W: 0 |
| P: 5300<br>O: 0.6<br>W: 0 | P: 4850<br>O: 0.78<br>W: 0 | P: 4780<br>O: 0.8<br>W: 07 | P: 5000<br>O: 0.82<br>W: 0 | P: 5500<br>O: 0.62<br>W: 0 |
| P: 5250<br>O: 0.57<br>W: 0 | P: 5200<br>O: 0.68<br>W: 0 | P: 5500<br>O: 0.76<br>W: 0 | P: 5500<br>O: 0.77<br>W: 0 | P: 5500<br>O: 0.6<br>W: 0 |

| P: 5500<br>O: 0.6<br>W: 0 | P: 5500<br>O: 0.69<br>W: 0 | P: 5500<br>O: 0.7<br>W: 0 | P: 5500<br>O: 0.72<br>W: 0 | P: 5500<br>O: 0.63<br>W: 0 |
|---|---|---|---|---|
| P: 5500<br>O: 0.62<br>W: 0 | P: 5000<br>O: 0.78<br>W: 0 | P: 5000<br>O: 0.85<br>W: 0 | P: 5000<br>O: 0.86<br>W: 0 | P: 5500<br>O: 0.65<br>W: 0 |
| P: 5000<br>O: 0.65<br>W: 0.07 | P: 4750<br>O: 0.75<br>W: 0 | WELL | P: 5000<br>O: 0.86<br>W: 0 | P: 5500<br>O: 0.67<br>W: 0 |
| P: 5150<br>O: 0.6<br>W: 0 | P: 4800<br>O: 0.78<br>W: 0 | P: 4750<br>O: 0.8<br>W: 0 | P: 5000<br>O: 0.82<br>W: 0 | P: 5500<br>O: 0.62<br>W: 0 |
| P: 5200<br>O: 0.57<br>W: 0 | P: 5150<br>O: 0.68<br>W: 0 | P: 5500<br>O: 0.76<br>W: 0 | P: 5500<br>O: 0.77<br>W: 0 | P: 5500<br>O: 0.6<br>W: 0 |

| P: 5500<br>O: 0.6<br>W: 0 | P: 5500<br>O: 0.69<br>W: 0 | P: 5500<br>O: 0.7<br>W: 0 | P: 5500<br>O: 0.72<br>W: 0 | P: 5500<br>O: 0.63<br>W: 0 |
|---|---|---|---|---|
| P: 5500<br>O: 0.62<br>W: 0 | P: 5000<br>O: 0.78<br>W: 0 | P: 5000<br>O: 0.85<br>W: 0 | P: 5000<br>O: 0.86<br>W: 0 | P: 5500<br>O: 0.65<br>W: 0 |
| P: 5000<br>O: 0.65<br>W: 07 | P: 4750<br>O: 0.75<br>W: 0 | WELL | P: 5000<br>O: 0.86<br>W: 0 | P: 5500<br>O: 0.67<br>W: 0 |
| P: 5150<br>O: 0.6<br>W: 13 | P: 4800<br>O: 0.78<br>W: 0 | P: 4750<br>O: 0.8<br>W: 0 | P: 5000<br>O: 0.82<br>W: 0 | P: 5500<br>O: 0.62<br>W: 0 |
| P: 5200<br>O: 0.57<br>W: 0.09 | P: 5150<br>O: 0.68<br>W: 01 | P: 5500<br>O: 0.76<br>W: 0 | P: 5500<br>O: 0.77<br>W: 0 | P: 5500<br>O: 0.6<br>W: 0 |

| P: 5500<br>O: 0.6<br>W: 0 | P: 5500<br>O: 0.69<br>W: 0 | P: 5500<br>O: 0.7<br>W: 0 | P: 5500<br>O: 0.72<br>W: 0 | P: 5500<br>O: 0.63<br>W: 0 |
|---|---|---|---|---|
| P: 5500<br>O: 0.62<br>W: 0 | P: 5000<br>O: 0.78<br>W: 0 | P: 5000<br>O: 0.85<br>W: 0 | P: 5000<br>O: 0.86<br>W: 0 | P: 5500<br>O: 0.65<br>W: 0 |
| P: 5500<br>O: 0.65<br>W: 0 | P: 5000<br>O: 0.75<br>W: 0 | WELL | P: 5000<br>O: 0.86<br>W: 0 | P: 5500<br>O: 0.67<br>W: 0 |
| P: 5500<br>O: 0.6<br>W: 0 | P: 5000<br>O: 0.78<br>W: 0 | P: 5000<br>O: 0.8<br>W: 0 | P: 5000<br>O: 0.82<br>W: 0 | P: 5500<br>O: 0.62<br>W: 0 |
| P: 5500<br>O: 0.57<br>W: 0 | P: 5500<br>O: 0.68<br>W: 0 | P: 5500<br>O: 0.76<br>W: 0 | P: 5500<br>O: 0.77<br>W: 0 | P: 5500<br>O: 0.6<br>W: 0 |

FIG. 23

| | | | | | | | | | | | Y → |
|---|---|---|---|---|---|---|---|---|---|---|---|
| P: 5500 O: 0.6 W: 0 | P: 5500 O: 0.63 W: 0 | P: 5500 O: 0.72 W: 0 | P: 5500 O: 0.7 W: 0 | P: 5500 O: 0.69 W: 0 | P: 5500 O: 0.6 W: 0 | P: 5200 O: 0.57 W: 0.09 | P: 5500 O: 0.6 W: 0 | P: 5500 O: 0.77 W: 0 | P: 5500 O: 0.76 W: 0 | P: 5150 O: 0.68 W: 0.1 | |
| P: 5500 O: 0.62 W: 0 | P: 5500 O: 0.65 W: 0 | P: 5000 O: 0.86 W: 0 | P: 5000 O: 0.85 W: 0 | P: 5000 O: 0.78 W: 0 | P: 5500 O: 0.6 W: 0 | P: 5500 O: 0.6 W: 0 | P: 5500 O: 0.63 W: 0 | P: 5000 O: 0.72 W: 0 | P: 5500 O: 0.7 W: 0 | P: 5500 O: 0.69 W: 0 | |
| P: 5500 O: 0.6 W: 0 | P: 5500 O: 0.63 W: 0 | P: 5500 O: 0.72 W: 0 | P: 5500 O: 0.7 W: 0 | P: 5500 O: 0.69 W: 0 | P: 5500 O: 0.62 W: 0 | P: 5200 O: 0.57 W: 0 | P: 5500 O: 0.6 W: 0 | WELL | P: 5500 O: 0.76 W: 0 | P: 5150 O: 0.68 W: 0 | |
| P: 5500 O: 0.62 W: 0 | P: 5500 O: 0.65 W: 0 | P: 5000 O: 0.86 W: 0 | P: 5000 O: 0.85 W: 0 | P: 5000 O: 0.78 W: 0 | P: 5500 O: 0.6 W: 0 | P: 5500 O: 0.6 W: 0 | P: 5500 O: 0.63 W: 0 | P: 5000 O: 0.72 W: 0 | P: 5500 O: 0.7 W: 0 | P: 5500 O: 0.69 W: 0 | |
| P: 5000 O: 0.65 W: 0.07 | P: 5500 O: 0.67 W: 0 | P: 5000 O: 0.82 W: 0 | P: 5000 O: 0.82 W: 0 | P: 4750 O: 0.75 W: 0 | P: 5000 O: 0.62 W: 0 | P: 5500 O: 0.63 W: 0 | P: 5500 O: 0.72 W: 0 | P: 5500 O: 0.7 W: 0 | P: 5500 O: 0.78 W: 0 | X → |
| WELL | P: 4750 O: 0.8 W: 0 | P: 5000 O: 0.77 W: 0 | P: 5500 O: 0.77 W: 0 | P: 4800 O: 0.78 W: 0 | P: 5150 O: 0.6 W: 0.13 | P: 5500 O: 0.65 W: 0 | P: 5500 O: 0.67 W: 0 | P: 5500 O: 0.85 W: 0 | P: 5000 O: 0.7 W: 0 | P: 5500 O: 0.69 W: 0 | |
| P: 5150 O: 0.6 W: 0.13 | P: 5500 O: 0.76 W: 0 | P: 5500 O: 0.72 W: 0 | P: 5500 O: 0.72 W: 0 | P: 5150 O: 0.68 W: 0.1 | P: 5200 O: 0.57 W: 0.09 | P: 5500 O: 0.6 W: 0 | P: 5500 O: 0.62 W: 0 | WELL | P: 5000 O: 0.8 W: 0 | P: 5500 O: 0.78 W: 0 | |
| P: 5200 O: 0.57 W: 0.09 | P: 5500 O: 0.6 W: 0 | P: 5500 O: 0.6 W: 0 | P: 5500 O: 0.72 W: 0 | P: 5500 O: 0.69 W: 0 | P: 5500 O: 0.6 W: 0 | P: 5500 O: 0.6 W: 0 | P: 5500 O: 0.6 W: 0 | P: 5000 O: 0.8 W: 0 | P: 5500 O: 0.76 W: 0 | P: 5000 O: 0.75 W: 0 | |
| P: 5500 O: 0.6 W: 0 | P: 5500 O: 0.63 W: 0 | P: 5500 O: 0.72 W: 0 | P: 5500 O: 0.7 W: 0 | P: 5500 O: 0.69 W: 0 | P: 5300 O: 0.6 W: 0 | P: 5500 O: 0.6 W: 0 | P: 5500 O: 0.6 W: 0 | P: 5500 O: 0.76 W: 0 | P: 5500 O: 0.68 W: 0 | P: 5500 O: 0.57 W: 0 | |
| P: 5500 O: 0.62 W: 0 | P: 5500 O: 0.62 W: 0 | P: 5000 O: 0.82 W: 0 | P: 4780 O: 0.8 W: 0 | P: 4850 O: 0.78 W: 0 | | | | | | | |

A grid map showing reservoir cell data. Each cell contains three values: P (pressure), O (oil saturation), and W (water saturation). Three cells are labeled "WELL". The "N" directional arrow indicates orientation.

| | | | | | |
|---|---|---|---|---|---|
| P: 5500 O: 0.6 W: 0 | P: 5500 O: 0.6 W: 0 | | P: 5500 O: 0.69 W: 0 | P: 5500 O: 0.6 W: 0 | P: 5150 O: 0.68 W: 0.1 |
| P: 5500 O: 0.63 W: 0 | P: 5500 O: 0.62 W: 0 | P: 5500 O: 0.76 W: 0 | P: 5000 O: 0.78 W: 0 | P: 5200 O: 0.57 W: 0.09 | P: 5500 O: 0.69 W: 0 |
| P: 5500 O: 0.6 W: 0 | P: 5500 O: 0.6 W: 0 | | P: 5500 O: 0.69 W: 0 | P: 5500 O: 0.6 W: 0 | P: 5500 O: 0.69 W: 0 |
| P: 5500 O: 0.65 W: 0 | P: 5500 O: 0.62 W: 0 | P: 5500 O: 0.76 W: 0 | P: 5000 O: 0.78 W: 0 | P: 5200 O: 0.57 W: 0 | P: 5150 O: 0.68 W: 0 |
| P: 5500 O: 0.63 W: 0 | P: 5500 O: 0.6 W: 0 | | P: 5000 O: 0.78 W: 0 | P: 5500 O: 0.6 W: 0 | P: 5500 O: 0.69 W: 0 |
| P: 5500 O: 0.65 W: 0 | P: 5500 O: 0.62 W: 0 | P: 5500 O: 0.7 W: 0 | P: 5000 O: 0.86 W: 0 | P: 5500 O: 0.72 W: 0 | P: 5500 O: 0.69 W: 0 |
| P: 5500 O: 0.67 W: 0 | P: 5000 O: 0.65 W: 0.07 | WELL | P: 4750 O: 0.75 W: 0 | P: 5500 O: 0.63 W: 0 | P: 5500 O: 0.6 W: 0 |
| P: 5500 O: 0.62 W: 0 | P: 5150 O: 0.6 W: 0.13 | P: 5500 O: 0.69 W: 0 | P: 4800 O: 0.78 W: 0 | P: 5500 O: 0.65 W: 0 | P: 5500 O: 0.62 W: 0 |
| P: 5500 O: 0.6 W: 0 | P: 5200 O: 0.57 W: 0.09 | P: 5000 O: 0.75 W: 0 | P: 5150 O: 0.68 W: 0.1 | P: 5500 O: 0.67 W: 0 | P: 5500 O: 0.65 W: 0 |
| P: 5500 O: 0.63 W: 0 | P: 5500 O: 0.6 W: 0 | P: 5000 O: 0.78 W: 0 | P: 5500 O: 0.69 W: 0 | P: 5500 O: 0.62 W: 0 | P: 5500 O: 0.6 W: 0 |
| P: 5500 O: 0.62 W: 0 | P: 5300 O: 0.6 W: 0 | P: 5500 O: 0.68 W: 0 | P: 4850 O: 0.78 W: 0 | P: 5500 O: 0.77 W: 0 | P: 5500 O: 0.57 W: 0 |

$t_2$

| P: 5500 O: 0.6 W: 0 | P: 5500 O: 0.69 W: 0 | P: 5500 O: 0.7 W: 0 | P: 5500 O: 0.72 W: 0 | P: 5500 O: 0.63 W: 0 |
|---|---|---|---|---|
| P: 5500 O: 0.62 W: 0 | P: 5000 O: 0.78 W: 0 | P: 5000 O: 0.85 W: 0 | P: 5000 O: 0.86 W: 0 | P: 5500 O: 0.65 W: 0 |
| P: 5100 O: 0.65 W: 0 | P: 4800 O: 0.75 W: 0 | WELL | P: 5000 O: 0.86 W: 0 | P: 5500 O: 0.67 W: 0 |
| P: 5300 O: 0.6 W: 0 | P: 4850 O: 0.78 W: 0 | P: 4780 O: 0.8 W: 0 | P: 5000 O: 0.82 W: 0 | P: 5500 O: 0.62 W: 0 |
| P: 5250 O: 0.57 W: 0 | P: 5200 O: 0.68 W: 0 | P: 5500 O: 0.76 W: 0 | P: 5500 O: 0.77 W: 0 | P: 5500 O: 0.6 W: 0 |

| P: 5500 O: 0.6 W: 0 | P: 5500 O: 0.69 W: 0 | P: 5500 O: 0.7 W: 0 | P: 5500 O: 0.72 W: 0 | P: 5500 O: 0.63 W: 0 |
|---|---|---|---|---|
| P: 5500 O: 0.62 W: 0 | P: 5000 O: 0.78 W: 0 | P: 5000 O: 0.85 W: 0 | P: 5000 O: 0.86 W: 0 | P: 5500 O: 0.65 W: 0 |
| P: 5000 O: 0.65 W: 0.07 | P: 4750 O: 0.75 W: 0 | WELL | P: 5000 O: 0.86 W: 0 | P: 5500 O: 0.67 W: 0 |
| P: 5150 O: 0.6 W: 0.13 | P: 4800 O: 0.78 W: 0 | P: 4750 O: 0.8 W: 0 | P: 5000 O: 0.82 W: 0 | P: 5500 O: 0.62 W: 0 |
| P: 5200 O: 0.57 W: 0.09 | P: 5150 O: 0.68 W: 0.1 | P: 5500 O: 0.76 W: 0 | P: 5500 O: 0.77 W: 0 | P: 5500 O: 0.6 W: 0 |

FIG. 25

SOUND ENABLING COMPUTERIZED SYSTEM FOR REAL TIME RESERVOIR MODEL CALIBRATION USING FIELD SURVEILLANCE DATA

BACKGROUND OF THE INVENTION

1. Field of the Invention

The present invention relates to computerized simulation of hydrocarbon reservoirs in the earth, and in particular to reservoir surveillance of producing oil and gas fields to monitor and calibrate changes in the simulated fluid and rock properties of a reservoir.

2. Description of the Related Art

It has been common or conventional to simulate the fluid and rock properties of subsurface hydrocarbon reservoirs with computerized models. In recent years, a reservoir simulator with massive parallel processing capabilities for large scale reservoir simulation was developed by the assignee of the present application. The reservoir simulator was known as the POWERS simulator and was described in the literature. See, for example articles by Dogru, A. H., et al, "A Massively Parallel Reservoir Simulator for Large Scale Reservoir Simulation," Paper SPE 51886 presented at the 1999 SPE Reservoir Simulation Symposium, Houston Tex., February 1999 and by Dogru, A. H., Dreiman, W. T., Hemanthkumar, K. and Fung, L. S., "Simulation of Super K Behavior in Ghawar by a Multi-Million Cell Parallel Simulator," Paper SPE 68066 presented at the Middle East Oil Show, Bahrain, March 2001.

The analysis of multi-million-cell reservoir simulation results has been a relatively new challenge to the petroleum industry. Recently, as disclosed in commonly-owned U.S. patent application Ser. No. 10/916,851, "A HIGHLY-PARALLEL, IMPLICIT COMPOSITIONAL RESERVOIR SIMULATOR FOR MULTI-MILLION CELL MODELS," filed Aug. 12, 2004, now U.S. Pat. No. 7,526,418, it has become possible to simulate giant datasets within practical time limits. With computer power making reservoir size and cell numbers less of a problem, the capability of human-machine interface to promptly interact and discern potential problem areas in the vast amounts of data has become a concern.

So far as is known, previous efforts have related either to advanced visualization of three-dimensional data from reservoir simulation or to data-mining approaches in attempts to achieve faster analysis.

Conventional visualization techniques have been generally sufficient when the simulation grid blocks have been on the order of some hundreds of thousands. A reservoir engineer's analysis time for datasets of this size has been comparable with computer processing turnaround time for simulation results. With multi-million-cell reservoir simulation, however, data analysis has become a significant bottleneck when conventional monitoring techniques have been used.

Reservoir surveillance of producing oil and gas fields has recently become of interest in the petroleum industry. The intent of reservoir surveillance has been to gather dynamic measurements which could potentially be used to improve management of a producing field, and to possibly optimize recovery of hydrocarbons. Dynamic measurements indicated changing conditions in the reservoir and were intended to provide a reservoir engineer with data complementary to the initial static or historical information from which reservoir simulation models were originally built. So far as is known, previous work in reservoir surveillance has related to development of equipment for performing field measurements and to design of surveys to gather data for surveillance.

Reservoir surveillance or monitoring has, so far as is known, been accomplished by acquiring real-time reservoir measurements to augment our knowledge about the reservoir. The fundamental premise in this data acquisition has been that dynamic measurements were indicative of substantive changes occurring in the reservoir. As fluids move during hydrocarbon production, by virtue of water displacing oil or by gas evolving as a gas cap that was previously dissolved in the oil, changes occur in the intrinsic properties of the reservoir, such as fluid density and sonic velocity.

Direct measurement of these changes is an indication of what is happening inside the reservoir. Present reservoir surveillance techniques include the following: (a) 4D or time-lapse seismic (repeated seismic surveying); (b) borehole gravimetry (direct density measurements at the borehole); (c) microseismic monitoring (sensing of micro-earthquakes occurring in the reservoir); and (d) electromagnetic resistivity monitoring (measuring electric resistance of reservoir fluids). As reservoir monitoring technologies have been applied in the last 10 years, it has become apparent that not all reservoirs respond equally well to these direct measurement techniques.

4D time-lapse seismic monitoring relies on the change in seismic amplitude (impedance and reflectivity) as fluids move inside the reservoir. Water displacing oil can have a dimming effect on the brightness of observed amplitudes. This has proven a useful monitoring technique in many fields. But in the case of giant reservoirs, such dimming may take many years to be observable with precision. Furthermore, this change can only be confidently established in areas with good seismic signal quality. Many reservoirs in the Middle East, for example, have a number of seismic data quality challenges that make 4D seismic of limited applicability and uncertain success.

Borehole gravimetry monitoring relies on observed changes of density at wellbore locations. Water displacing gas represents a very measurable density change. Water displacing oil represents a smaller but still measurable density change. In reservoirs with high salinity, however, these differences can be masked.

Microseismic monitoring relies on sensing micro-earthquakes generated by stress changes inside the reservoir. These stress changes occur because part of the reservoir rock, under a constant overburden stress, loses pore pressure due to fluid production escaping the rock. This increases the effective stress (which is the difference between overburden confining stress and pore pressure) and the subsequent rock deformation can produce cracks detectable by seismograms at well-bore stations. The consistency of the rock matrix is sometimes too brittle to crack with appreciable tremors, depending on the elastic properties of the rock.

Electromagnetic monitoring relies on measuring formation resistivity. Oil-bearing sands are highly resistive (i.e. low electrical conductivity), whereas water-bearing sands show low resistivity. Depending on the electric properties of the rock, one can relate resistivity change to oil saturation change.

So far as is known, conventional ways to refine or update an existing reservoir model has been by what is known as history matching using well production data from the reservoir. Other data such as that from reservoir surveillance techniques of the types mentioned was not included dynamically into adjustments of the reservoir model. As has been mentioned, time-lapse seismic simulations to indicate postulated changes in an existing model have been used, but seismic data does not directly relate to fluid or rock properties.

SUMMARY OF THE INVENTION

Briefly, the present invention provides a new and improved computer-implemented method of calibrating a computerized reservoir model based on actual reservoir monitoring measurements obtained from a subsurface hydrocarbon reservoir. Numerical predictions are generated in the computer of reservoir variables in the computerized reservoir model indicating predicted fluid and rock properties of the reservoir. The generated numerical reservoir variable predictions are then converted into predicted sound sequences indicative of the generated numerical reservoir variable predictions. The predicted sound sequences indicative of the generated numerical change predictions are then stored. Actual reservoir monitoring measurements are converted into actual sound sequences indicative of the actual reservoir monitoring measurements, and the actual sound sequences are stored. An interactive comparison of the predicted sound sequences and the actual sound sequences is made at a selected time step to determine if adjustments in the computerized reservoir model are necessary.

The present invention also provides a data processor which performs the processing steps according to the present invention to calibrate a computerized reservoir model based on actual reservoir monitoring measurements obtained from a subsurface hydrocarbon reservoir. The present invention further provides a computer program product in the form of machine-readable instructions for calibrating a computerized reservoir model based on actual reservoir monitoring measurements obtained from a subsurface hydrocarbon reservoir to perform the processing steps according to the present invention.

BRIEF DESCRIPTION OF THE DRAWINGS

FIGS. 14, 15, 16, 17, 18, 19, 20, 21, 22, 23, 24 and 25 are example plots of data indicating wells, subsurface reservoir cells and certain formation fluid or rock properties of such cells obtained according to the present invention.

DETAILED DESCRIPTION OF THE PREFERRED EMBODIMENTS

Figure 1:
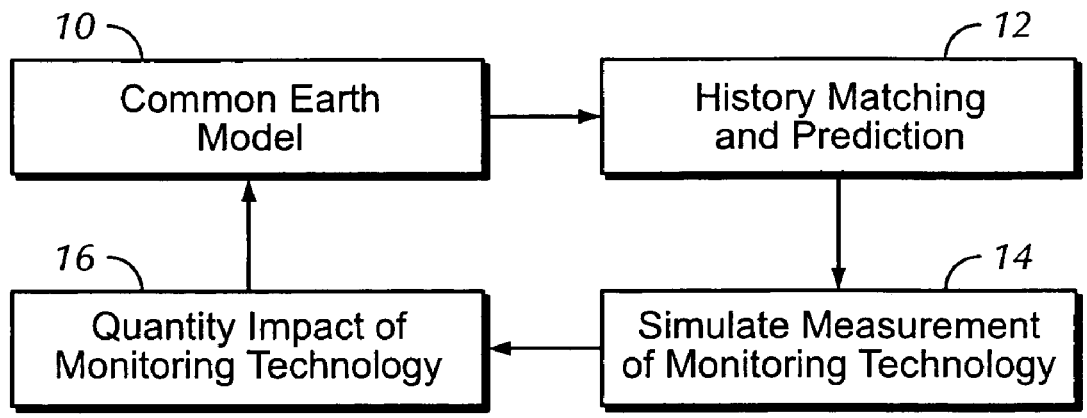
FIG. 1 is a functional block diagram of a process of identification and ranking of reservoir monitoring technologies performed in conjunction with the present invention.

In the drawings, FIG. 1 illustrates schematically the methodology according to the present invention of evaluating the suitability of one or more of a number of prospective or candidate reservoir surveillance or monitoring technologies by simulating the magnitude of the observable reservoir changes. The most commonly used, as has been discussed, are: microseismic monitoring; borehole gravimetry monitoring; time-lapse (or 4D) seismic; multi-component seismic; and cross-well electromagnetics. If the magnitude of the monitored changes is substantial enough to be reliably measured, then the monitoring technology is indicated as practical to be implemented or installed in the reservoir field. Once the selected one or more monitoring technologies is implemented, real-time surveillance of the reservoir can proceed.

With this feature of the present invention, no investment in monitoring hardware need be incurred until its benefits have been quantified via modeling. FIG. 1 schematically illustrates the process of identification and ranking of candidate reservoir monitoring technologies. In FIG. 1, as indicated schematically at 10, a common earth model of the reservoir serves as the starting point for the identification and monitoring of candidate reservoir monitoring technologies. As indicated at 12, based on prior history a matching prediction of the reservoir under consideration is made using experience, intuition and other factors. The result of the matching prediction is a selected one or more of the types of reservoir monitoring technologies considered likely to be suitable for the reservoir under consideration. Next, as indicated at 14, a simulation is performed over a suitable time span of estimated life of the reservoir. The simulation is made to determine the magnitude of the reservoir property or properties which are detectable by the selected or candidate reservoir monitoring technology. The simulation is preferably performed according to the techniques of commonly owned U.S. patent application Ser. No. 10/916,851, cited above. Then as indicated at 16, the consequences and impact of the candidate monitoring technology are quantified. If a negligible or insignificant change over time is observed in the reservoir property or properties being simulated, it can be assumed that any such changes would be obscured over the reservoir life by measurement errors or repeatability errors. Alternative reservoir monitoring technologies can then be selected as candidates for evaluation according to the procedure shown in FIG. 1. If significant change is observed, however, the frequency and magnitude of the simulated changes provide information as to the optimal time intervals for measurements to be observed by the candidate monitoring technology for maximum benefit.

In the present invention, reservoir simulator data of the type obtained as disclosed in co-pending, commonly owned U.S. patent application Ser. No. 10/916,851 referenced above is further processed according to a petro-elastic model. The results of the processing sequence are then used to determine, a-priori, whether it makes sense to obtain 4D seismic data by simulating the acoustic impedance response of reservoir cells over time. If a negligible change is observed over time or a small change of the order of 5 or 10%, it can be concluded that such change can easily be masked by measurement errors and repeatability errors. In such cases, modeled results from the present invention instead indicate that alternative surveillance techniques be investigated before equipment expenditure and investment need be made on actual 4D seismic surveys.

On the other hand, when significant impedance change is observed, the present invention provides information indicating the optimal time intervals during which the 4D seismic survey data should be acquired for maximum benefit. Real-time surveillance of the reservoir can then proceed. Thus, as noted, no investment in monitoring hardware need be incurred until its benefits have been quantified via modeling.

With the present invention, the simulator is further used to predict the magnitude of change of subsurface reservoir bulk density properties at different well locations. The bulk density surveillance results indicate whether borehole gravimetry surveillance should be applied in a given reservoir. The data also would indicate what well locations offer the most useful borehole gravimetry surveillance.

According to the present invention, the simulator also predicts the magnitude of changes in reservoir stress due to fluid production or other causes at different well locations. The predicted stress and related fracture and subsidence data indicate whether a microseismic monitoring surveillance technique should be applied in a given reservoir. The data also indicate what well locations offer the most useful microseismic surveillance sites if the technique is indicated to be desirable or feasible.

With the present invention, the simulator is further used to predict the magnitude of change of formation resistivity derived from changes in formation saturation. The formation resistivity predictions indicate whether cross-well electromagnetic monitoring should be applied in a given reservoir. The data also would indicate which well locations offer the most suitable sites for cross-well electromagnetic surveillance.

Once one or more of these monitoring technologies shows a favorable ranking and has been implemented, the present invention permits the reservoir engineer to evaluate the field measurements by comparing them with the simulated response. The engineer may adjust the frequency of data acquisition based on the rate of change of the monitored property that the simulation has predicted.

Figure 2:
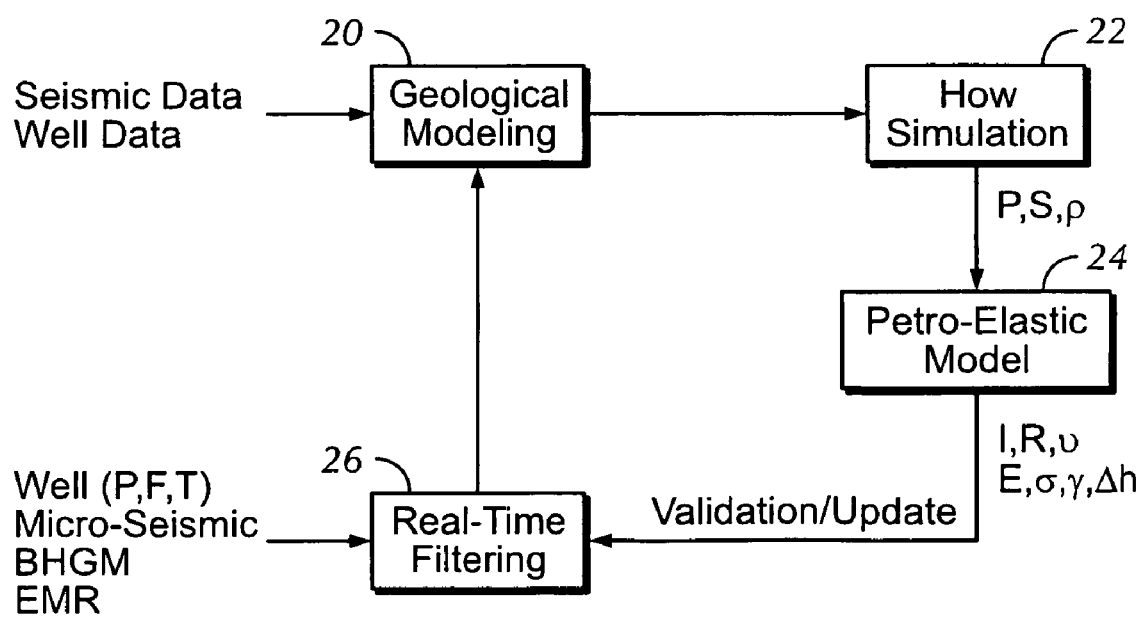
FIG. 2 is a functional block diagram of a process of integration of reservoir flow simulation with a petro-elastic model and real-time field data according to the present invention.

The present invention also provides validation of the geological model itself since the simulator can generate seismic information at time zero (i.e. before any production) to correlate with the seismic data used to build the geological model. After some calibration, the engineer may be able to advance the simulation synchronously with the field measurements. FIG. 2 illustrates schematically the integration of reservoir flow simulation with the petro-elastic model and real-time field data.

As shown in FIG. 2, an existing model of the reservoir under consideration based on seismic data and well data is initially present in the form of a simulation database as shown at 20. The reservoir database is then processed as indicated at 22 to a suitable flow modeling process. A preferred such modeling process is that described in disclosed in co-pending, commonly owned U.S. patent application Ser. No. 10/916,851 referenced above. It should be understood that other flow modeling computer processes could be used as well. The results of the flow modeling process are certain properties of the reservoir such as pressure, fluid saturation, fluid density and the like formation properties in the cells of the reservoir over its projected production life.

Next, as shown at 24, a petro-elastic modeling computer process is performed, as will be described below. The results of the petro-elastic modeling are then compared during a real-time filtering step 26 with field measurements obtained by selected monitoring surveillance techniques.

Processing of data according to the present invention may be performed in a number of computer platforms. For example, the processing may be performed in a reservoir simulator of the type disclosed in co-pending, commonly owned U.S. patent application Ser. No. 10/916,851, "A HIGHLY-PARALLEL, IMPLICIT COMPOSITIONAL RESERVOIR SIMULATOR FOR MULTI-MILLION CELL MODELS" as mentioned above. The present invention may also be implemented in conjunction with a mixed paradigm parallel (combination of shared memory parallel and massively parallel) reservoir simulator, as well as other paradigms for parallel reservoir simulation.

Figure 4:
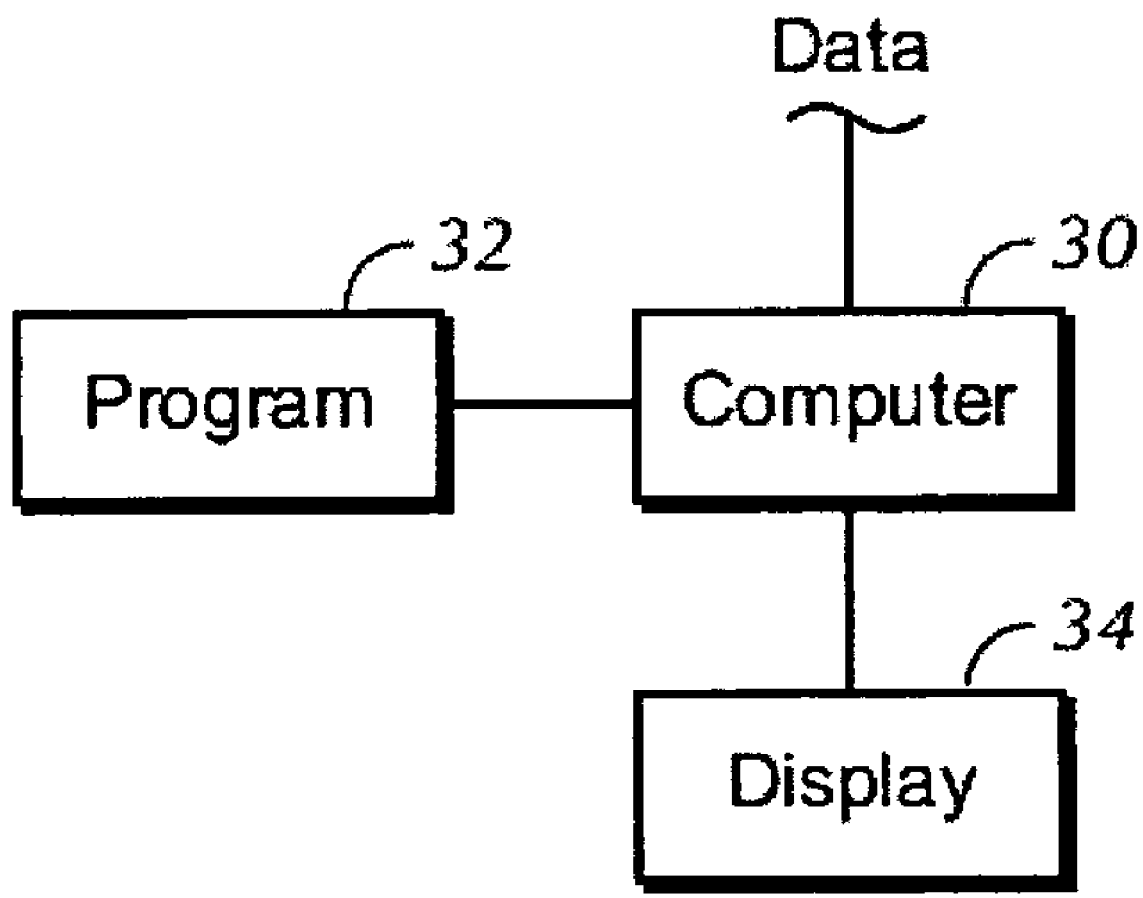
FIG. 4 is a functional block diagram of a computer and associated peripherals for reservoir surveillance of producing oil and gas fields to monitor and calibrate changes in the fluid and rock properties of a hydrocarbon reservoir according to the present invention.

The processor of the computer as shown schematically at 30 (FIG. 4) receives the data concerning the reservoir of interest to undertake the logic of the present invention, which may be executed by a processor as a series of computer-executable instructions. The data concerning the reservoir of interest is provided from the simulator database formed during steps 20 and 22 shown in FIG. 2 and described herein. The instructions may be contained on a data storage device 32 with a computer readable medium, as shown, having a computer usable medium stored thereon. Or, the instructions may be stored in memory of the computer 30, or on magnetic tape, conventional hard disk drive, electronic read-only memory, optical storage device, or other appropriate data storage device. The results of the processing are then available on a video/audio display as shown at 34 or printer or any other form of output device.

Figure 3:
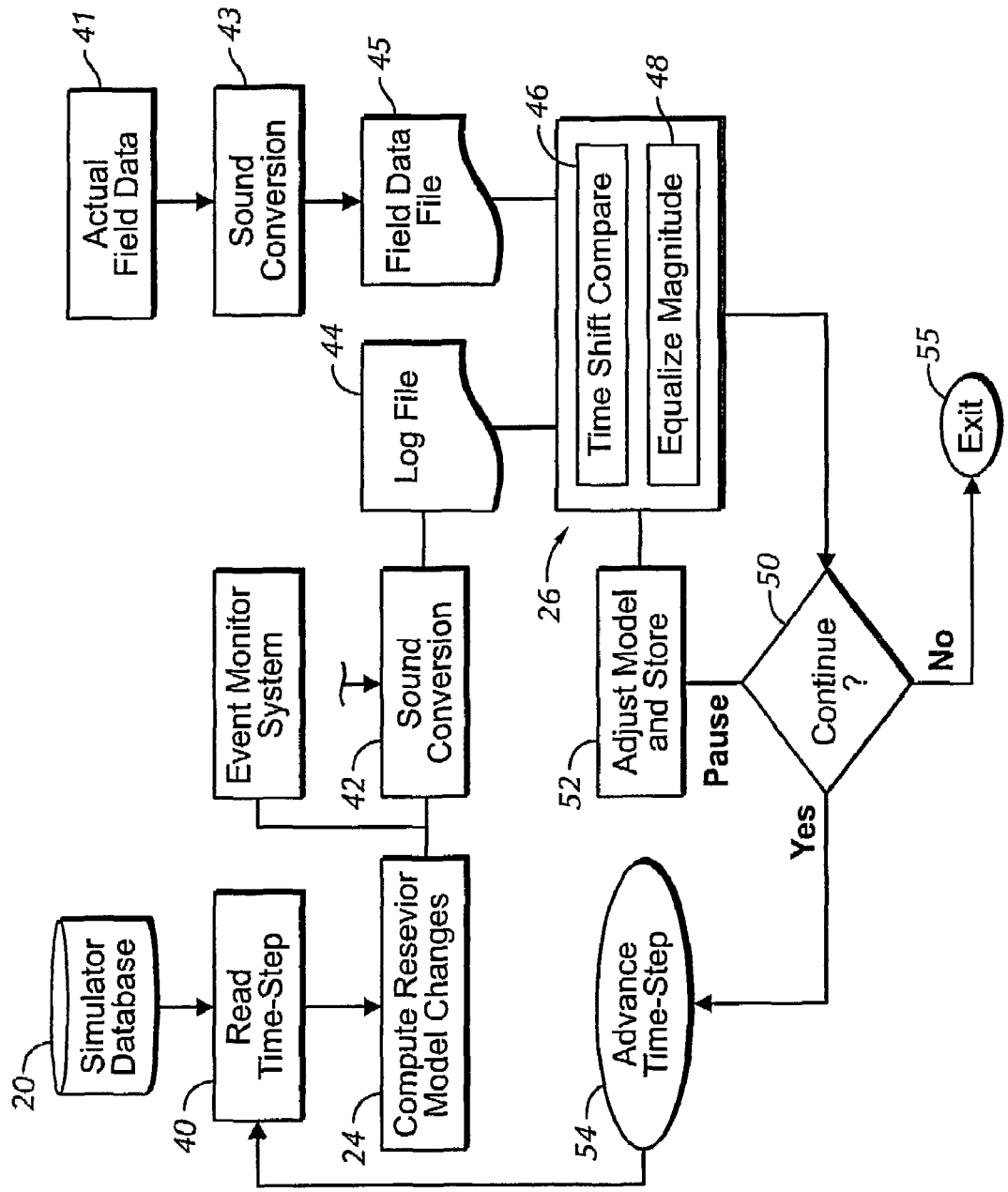
FIG. 3 is a block diagram of data processing steps according to the present invention.

The flow chart of FIG. 3 illustrates the structure of the logic of the present invention as embodied in computer program software. Those skilled in the art will appreciate that the flow charts illustrate the structures of computer program code elements including logic circuits on an integrated circuit that function according to this invention. Manifestly, the invention is practiced in its essential embodiment by a machine component that renders the program code elements in a form that instructs a digital processing apparatus (that is, a computer) to perform a sequence of function steps corresponding to those shown.

It is important to note that, while the present invention has been, and will continue to be, described in the context of a fully functional computer system, those skilled in the art will appreciate that the present invention is capable of being distributed as a program product in a variety of forms, and that the present invention applies equally regardless of the particular type of signal-hearing media utilized to actually carry out the distribution. Examples of signal-bearing media include: recordable-type media, such as floppy disks, hard disk drives, and CD ROMs.

It should be understood that the processing described herein can be implemented in a variety of other types of reservoir simulators. It can be run on a variety of computer platforms, such as single CPU, a shared memory parallel or massively parallel processing computer, a distributed memory super-computer, and a variety of PC clusters, such as a self-made PC cluster, or a production PC cluster.

A schematic flow chart of the processing according to the present invention for interactive analysis of simulation results is shown in FIG. 3. The process of FIG. 3 is a computer-implemented method of calibrating a computerized reservoir model based on actual reservoir monitoring measurements obtained from a subsurface hydrocarbon reservoir. The process of FIG. 3 is performed in real-time as directly-measured field data is obtained from the continuous measurement technology which is monitoring performance of the subsurface hydrocarbon reservoir during actual production. As will be set forth, digital and audio responses are generated as a result of changes in the reservoir's fluid and rock properties as predicted by the reservoir model, and the changes so generated are calibrated against the directly-measured field data. The results of the calibration according to the present invention permit adjustment and optimization of the reservoir model based on real-time data. As will be set forth, changes generated in the reservoir model can take a number of forms, for example: stress changes in rock (which can be correlated with passive micro-seismic measurements); impedance changes in rock (which can be correlated with either 4D or repeated 3D seismic measurements); and fluid density changes (which can be correlated with direct borehole gravimetry measurements).

The process of FIG. 3 is performed interactively by a reservoir engineer in conjunction with the computer 30 (FIG. 4) and in connection with the computer-implemented petro-elastic modeling process is being performed as indicated at 26 in FIG. 2. In the process illustrated in FIG. 2, a flow chart F indicates a sequence of processing steps according to the present invention. A step 40 begins the process by reading the data concerning the reservoir model or some portion thereof which is of interest for a particular time-step from the simulator database 20. Next, as indicated at step 24, changes in the data of the reservoir model from a previous time-step are determined. The data values obtained during step 24 are then converted to sound values during step 42 in a suitable conversion device or mechanism, such as a MIDI sequencer of the conventional type.

The sounds or audible signals formed from reservoir data variables during conversion step 42 are preferably based on MIDI musical scales. For example, a specific variable can be assigned to audit representation by a specific musical instrument, a range of notes and a pitch or volume, or some combination or variation thereof.

A more specific example, field pressure depletion can be represented by assigning an increasing sound pitch to indicate a corresponding loss of pore pressure and accompanying increase in effective stress. Another example is pressure change on an individual well being represented a pitch or tone ramping up progressively as pressure increases.

The computed reservoir model changes resulting from step 24 may also, if desired, be subjected to an event monitoring system as will be described below. The digital data values resulting from step 24 and the values resulting from sound conversion step 42 are then stored in a temporary log file during step 44.

Concurrently with the performance of steps 20, 40, 24 and 42, and in real-time directly-measured field data is obtained as indicated in step 41 from the continuous measurement technology which is monitoring performance of the subsurface hydrocarbon reservoir during actual production. The actual directly-measured data values obtained during step 41 are then converted to sound values during step 43 in a suitable conversion device or mechanism, such as a MIDI sequencer of the conventional type, as is the case in step 42 for reservoir model change data. The digital data values resulting from step 41 and the values resulting from sound conversion step 43 are then stored in a temporary field data file during step 45.

The reservoir change data from log file 44 and the temporary field data from file 45 are then subjected to cross-correlation step 26, which includes a time-shift comparison step 46 and a magnitude equalization step 48. The results of cross-correlation step 26 are then examined by the reservoir engineer interactively during step 50.

During interactive examination, the reservoir engineer may monitor events based on state of the art reservoir surveillance, where many measurements other than pressure are acquired in real-time. The petro-elastic model is used to compute seismic and stress responses that can be compared with measured variables.

Additionally, the reservoir engineer may try to monitor events on simulation variables such as pressure, saturation and mole-fraction compositions from a reservoir simulator output, triggering event alarms accordingly (e.g. dew point pressure, condensate dropout, high $H_2S$ concentration, etc.) and using field-measured pressure to validate their match. For such specific use which has previously been the traditional role of reservoir simulation, engineers do not need to invoke the petro-elastic model to generate stress, seismic or any other surveillance-related information, since no correspondence surveillance equipment is installed.

Based on the reservoir engineer's decision during step, a step 52 may be performed during which the present version of the reservoir model may be adjusted as to parameters or values of monitoring variables in the reservoir model. The adjusted or changed reservoir model values are then stored in the simulator database 20. Alternatively during step 52, the time-step may be adjusted during a step 54, and the process returns to step 40 for further processing for the new time-step in the manner previously described. A further alternative during decision step 52 is to exit as indicated at 55 from further processing.

Nomenclature of Variables

Set forth below for ease of reference and understanding is a listing of the nomenclature used in the Equations which express the physical relationships between the various parameters and measurements used in data processing steps and analysis according to the present invention:

$c_o$=Oil compressibility
$c_g$=Gas compressibility
$c_w$=Water compressibility
$C_\phi$=Layer compressibility
D=Reservoir depth
E=Young Modulus
G=Shear modulus
$G_{dry}$=Dry rock shear modulus
h=Reservoir layer thickness
K=Bulk modulus
$K_{dry}$=Dry rock bulk modulus
$K_f$=Fluid bulk modulus
$K_m$=Matrix bulk modulus
$K_t$=Estimated Gain of the Kalman Filter
$K_{u,t}$=Updated Gain of the Kalman Filter
m=Archie's cementation factor
n=Archie's saturation exponent
P=Pore Pressure
$R_p$=P-Wave reflectivity
$R_s$=S-Wave reflectivity
$R_t$=True formation resistivity
$R_w$=Formation water resistivity
$S_g$=Gas saturation
$S_o$=Oil saturation
$S_w$=Water saturation
$V_p$=P-Wave (acoustic) velocity
$V_s$=S-Wave (shear) velocity
$x_t$=Noisy measurement input to Kalman Filter
$Z_p$=P-Wave (acoustic) impedance
$Z_s$=S-Wave (shear) impedance
Greek Symbols:
$\alpha$=Biot's Parameter=
$\phi$=Porosity
$\gamma$=Fracture Gradient
$\nu$=Poisson's Ratio
$\rho_B$=Bulk density
$\rho_f$=Fluid density
$\rho_g$=Gas density $\rho_m$=Matrix (rock) density
$\rho_o$=Oil density
$\rho_w$=Water density
$\sigma_H$=Horizontal stress
$\sigma_V$=Vertical stress
$\sigma_n$=Standard deviation of noisy measurement
$\sigma_t$=Estimated standard deviation of Kalman Filter
$\sigma_{u,t}$=Updated standard deviation of Kalman Filter Petro-Elastic Model Mathematical computerized models added to the reservoir simulator provide the following information useful in both monitoring technology selection/ranking and in the real-time surveillance process:

Fluid modulus, fluid density and bulk density are given by the equations set forth below.

Equation 1:
$$K_f = \frac{1}{[c_w S_w + c_o S_o + c_g S_g]}$$

Equation 2:
$$\rho_f = \rho_w S_w + \rho_o S_o + \rho_g S_g$$

Equation 3:
$$\rho_B = \rho_m (1 - \phi) + \rho_f \phi$$

These quantities are used inside the simulator to compute the saturated bulk and shear moduli of the rock at every grid cell using the well-known Gassmann's equations.

Equation 4:
$$K = K_{dry} + \frac{\left(1 - \frac{K_{dry}}{K_m}\right)^2}{\frac{\phi}{K_f} + \frac{1-\phi}{K_m} - \frac{K_{dry}}{K_m^2}}$$

Equation 5:
$$G = G_{dry}$$

The values of K and G are used to compute petro-elastic P-Wave and S-Wave velocities inside the simulator:

Equation 6:
$$V_P = \sqrt{\frac{K + \frac{4}{3}G}{\rho_B}}$$

Equation 7:
$$V_S = \sqrt{\frac{G}{\rho_B}}$$

These velocities are then used to compute simulator-generated values for seismic impedance for both P and S waves:

$$Z_P = \rho_B V_P \qquad \text{Equation 8}$$

$$Z_S = \rho_B V_S \qquad \text{Equation 9}$$

These impedances are then used to generate seismic reflectivities (i.e. seismograms) from the simulation itself:

Equation 10:
$$R_P = \frac{Z_{P2} - Z_{P1}}{Z_{P2} + Z_{P1}}$$

Equation 11:
$$R_s = \frac{Z_{S2} - Z_{S1}}{Z_{S2} + S_{S1}}$$

P and S-Wave velocities are also used to compute the so-called Poisson's Ratio:

Equation 12:
$$v = \frac{V_s^2 - 0.5 V_p^2}{V_s^2 - V_p^2}$$

The Poisson's Ratio is then used to estimate several rock-mechanical stress-related quantities, such as Young modulus (which can be computed from either K or G):

$$E = 3K(1-2v) = 2(1+v)G \qquad \text{Equation 13}$$

and horizontal stress:

Equation 14:
$$\sigma_H = \frac{v}{1-v}\sigma_V + \frac{1-2v}{1-v}\alpha P$$

and fracture gradient:

Equation 15:
$$\gamma = \frac{v}{1-v}\frac{\sigma_V}{D}$$

and uni-axial compaction (more commonly known as "subsidence"):

Equation 16:
$$\frac{\Delta h}{h} = \frac{1}{3}\frac{1+v}{1-v}\phi C_\phi \Delta P$$

True formation resistivity is also computed, using the water saturation generated by the simulator and reservoir porosity, to assist reservoir monitoring via cross-well electromagnetics:

$$R_t = R_w \phi^{-m} S_w^{-n} \qquad \text{Equation 17}$$

Equations 1 through 17 comprise the "Petro-Elastic Model" for monitoring technology ranking and surveillance, which is coupled as disclosed above with the reservoir simulator. Each property is evaluated on a cell-by-cell basis. This means that an entire 3D volume of data can be generated for each of these properties and compared to actual measurements of these quantities at any simulation time.

Reservoir Property Displays

Figure 5:
FIGS. 5, 6, 7 and 8 are example display images of reservoir simulation properties formed according to the present invention.
Figure 6:
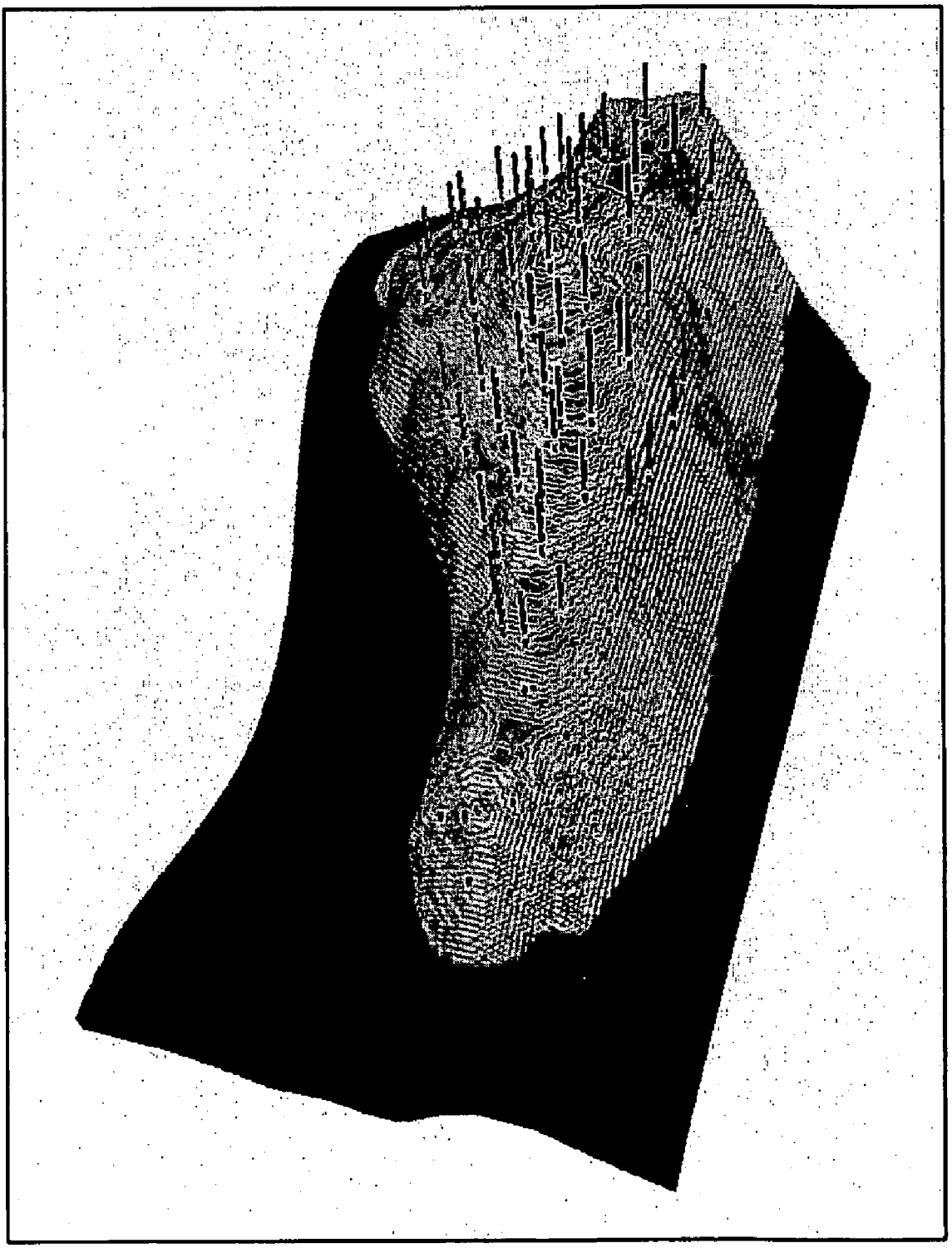
Figure 7:
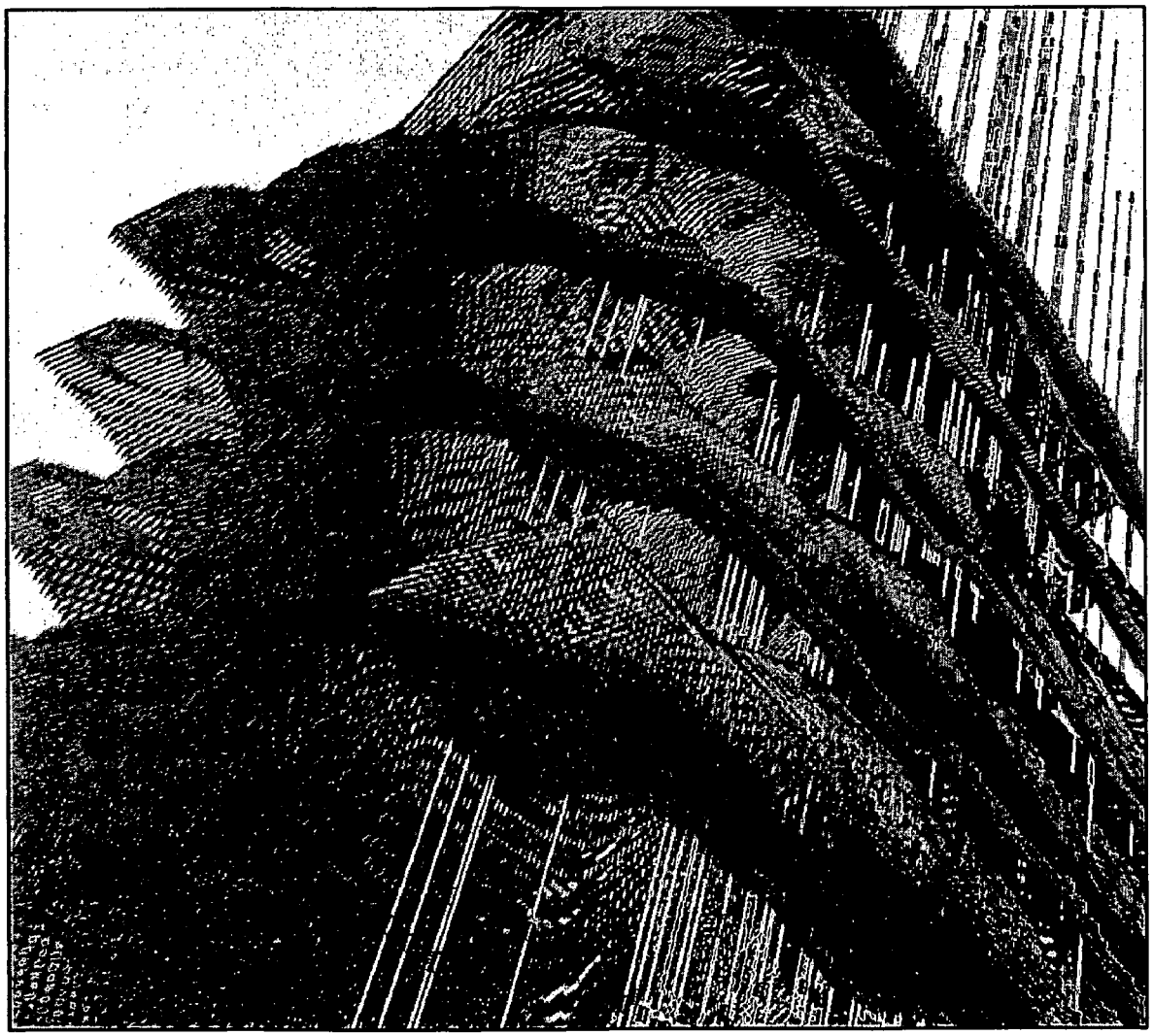

FIGS. 5 through 8 are images of display screens of certain properties for a subsurface hydrocarbon reservoir at a selected depth or region in the reservoir during a given time step obtained according to the present invention. FIG. 5 is an image of pressure P obtained from the flow simulation process. FIG. 6 is an image of gas saturation $S_g$ similarly obtained from the flow simulation process. FIG. 7 is an image of the pressure between layers in the reservoir similarly obtained from the flow simulation process.

Figure 8:
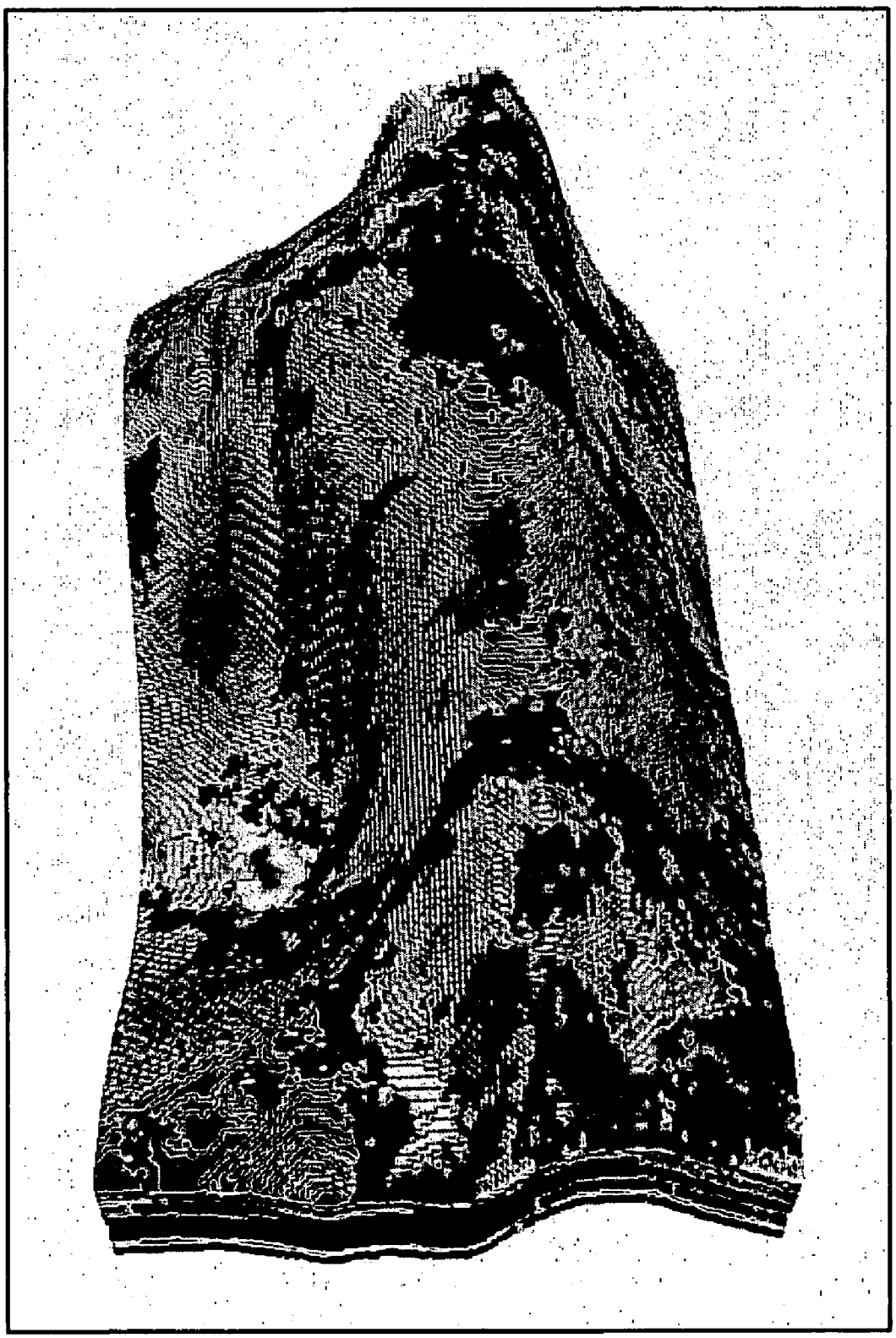

FIG. 8 is a self-organizing map of data obtained according to the present invention. A self-organizing map is a fairly traditional data-mining technique which combines multiple reservoir properties and condenses them into a single output volume of "classes". For example, reservoir porosity and permeabilities, horizontal and vertical, can be classified into "rock type" classes. This reduces the dimensionality of the dataset, meaning less data to handle, but masks the individual information of the reservoir properties that the engineer may need. For example, rocks with high porosity and high permeability can be made to appear in a class by themselves (i.e., "optimal flow" class) and low porosity and low permeability would appear in another distinct class (i.e., "poor rock quality" class). However, the individual information of quantitative value (percent p.u. for porosity or millidarcies for permeability) would not be readily available. The self-organizing map data such as that shown in FIG. 8 can be analyzed through the event monitor process if the engineer so desires.

It should be understood that other data-mining or data condensation techniques can be used as well. Clustering analysis is another technique like self-organizing maps which groups the information into clusters (another name for "classes") for quick qualitative analysis at the expense of quantitative detail. Clustering analysis looks for the dominant trends in the data, i.e. highlighting the clusters with highest and lowest number of members in their class.

Calibration of the model is necessary when the event measured and the events recorded are shifted in time such as, for example, when a density change due to water front movement happened much earlier (or later) in the model than verified by borehole density measurements. By "much earlier or later" it is meant a time lag that cannot simply be attributed to measurement latency, which is easily corrected by filtering. It is important to note that mere differences in magnitude between the variables modeled and measured do not usually require adjustment: it is the relative change that matters. This is natural to expect because seismic reflectivity generated by the simulator, for example, does not have the same amplitude of field-recorded seismic data. This should be adjusted by just applying a simple "gain" to one of the measurements (for which seismic information generated by the simulator at time zero, both impedance and reflectivity, is most valuable).

In this sense, it is useful to compute the "percent change" of any variable as an indicator. For the measured variables one would compute (measured(t+dt)−measured(t))/measured(t)*100, where t and t+dt indicate a reference time step and a later time step respectively. Similarly, for the modeled variables one would compute (modeled(t+dt)−modeled(t))/modeled(t)*100. If these two computations agree closely there is no need for correction (a 5% discrepancy can be considered normal in many cases, even a 10% discrepancy could occur due to rapidly varying environment conditions, such as temperature changes between day and night in Middle East deserts in the summer season).

Event Monitor Construct

As has been noted, FIGS. 5-8 are displays of individual properties or features at a selected depth or region in a reservoir during a particular time step. A number of reservoirs, however, are known to be composed of multiple millions of three-dimensional cells and a projected reservoir life of a significant number of years. The amount of data contained in these 3D volumes of each variable can be overwhelming as the reservoir simulation model may thus contain tens of millions of data variables to be displayed. The task of analyzing all this data may seem daunting at first but the computer 30 performs the search of any relevant features using an event monitor construct, as will be described. Using BNF (Backus-Naur Form) syntax, the engineer describes simple rules of what to search for. The computer program parses these rules and searches each cell for the variables involved in the rules.

With the present invention, an event monitor construct is provided for searching the simulation data for relevant features of interest to the reservoir engineer. The event monitor may apply the syntax rules to all wells involved in reservoir production, to a subset of wells in the reservoir model, to specific wells only or to all reservoir cells (or a range/subset of those cells). The event monitor may apply the syntax rules to all wells involved in reservoir production, to a subset of wells in the reservoir model, or to specific wells only. Combinations of these modes can be used in a set of rules for a single event monitor construct, if desired.

This event monitor construct provides a new and improved form of data analysis that complements three-dimensional (3-D) analysis of data such as that shown in the displays of FIGS. 5 through 8. A set of syntax rules prescribed by a reservoir engineer or analyst automatically finds patterns of interest in the data relating to reservoir conditions. The syntax rules may be applied to primary properties (FIGS. 5-7) of the reservoir as well as to data-mined byproducts (FIG. 8) of these properties, such as self-organizing maps, K-means clustering and the like. The engineer can be alerted to conditions of interest occurring at any location of interest in the reservoir. Example conditions include: condensate dropout at wells; sour gas migration; reservoir pressure approaching bubble point or dew point conditions; rapid fluid saturation changes; relative impedance changes; reservoir compaction changes and the like.

The reservoir pressure displayed in FIG. 5 is of special practical importance to the engineer because any pressure at a well lower than the dew-point-pressure will result in "condensate drop-out", which is the formation of condensate in the well. This reduces the gas flow performance and is, therefore, a condition the engineer must monitor carefully. Such an event would be monitored as follows (for a gas reservoir where the dew-point pressure is 6000 psi):

Event

CloseToDewPointPressure Always

At_Well(All_Wells,1)

Find_All Where ((PRESSURE<6000.0) AND (SGAS>0.1))
  Sound Talk("Pressure below 6000 at well",Well_Name)
  EndEvent Once significant condensate-dropout has occurred, another rule can track the amount of oil saturation in the condensate bank (high oil saturation will inhibit gas flow altogether) so that the engineer may decide to shut-down that particular well. The engineer will also look at the gas saturation display (FIG. 6) in this context:

Event
  WellDropout1 Always
  At_Well(All_Wells,1)
  Find_All Where (SOIL>0.15)
  Sound Talk("Condensate Dropout at Well", Well_Name)
  Graphics Opacity(0)
  EndEvent Instead of monitoring this condition at the wells, the engineer can also monitor throughout the reservoir:

Event
  CondensateDropout1 Always
  Find_All Where (SOIL>0.15)
  Sound Talk("Condensate Dropout at grid block", Cell_Location)
  Graphics Opacity(0)
  EndEvent The pressure display between layers (FIG. 7) will enable a reservoir engineer to see how many layers in the reservoir (or well perforations in the well) are being affected by condensate dropout in order to make a more informed decision as to the progress of this condensate banking and the need to close well perforations.

Another important operational situation of hydrogen sulfide ($H_2S$) migration in reservoirs due to well production using the following:

Event
  HighH2S Always
  Find_All Where (ZMF2>0.0001)
  Sound Talk("H2S Concentration High at grid block", Cell_Location)
  EndEvent This rule monitors any mole fraction of $H_2S$ that exceeds 0.0001. Not only is hydrogen sulfide corrosive to the well internals but also lowers the market value of the gas produced (because sour gas requires extra refining/processing steps to bring to market).

The following example monitors the occurrence of a positive gradient in P-impedance (also known as acoustic impedance):

Event
  Impedance1 Always
  Find_All Where (Gradient P_IMPEDA>0.0)
  Sound Talk("Positive Impedance Gradient at grid block", Cell_Location)
  EndEvent A positive gradient means that a fluid with lower density has been displaced by one with higher density. This is a typical case of water sweeping oil due to water injection to increase oil recovery and it is beneficial to know when and where this fluid displacement has occurred in the reservoir.

Similarly, the following example monitors the occurrence of a negative gradient in P-impedance or acoustic impedance:

Event
  Impedance2 Always
  Find_All Where (Gradient P_IMPEDA<0)
  Sound Talk("Negative Impedance Gradient at grid block", Cell_Location)
  EndEvent A negative gradient means that a fluid with higher density has been displaced by one with lower density. This is a typical case of secondary gas-cap formation, where gas comes out of its solution in oil to form a distinct thermodynamic phase as a gas dome on top of the oil reservoir. This is an effect of pressure decline in the reservoir and it is important to know when and where this has occurred in the reservoir.

The following describes the syntactic structure of the event monitor construct. To avoid ambiguity and verbose description, the syntax of this construct is presented using Backus Naur Form (BNF) Grammar. BNF is used because it is the most common notation used to express context-free grammars. A context-free grammar is a set of recursive rewriting rules, also termed productions, used to generate patterns of strings that can be easily parsed for further analysis. The recursiveness or ability to call itself of a context-free grammar makes it specifically adapted to build rules of arbitrarily complex logic while maintaining a structure that is easy to parse.

Each construct in the event monitor is chosen to find a particular event of interest in the data and perform a set of actions once the monitored event is detected. The body of the construct set forth below is mainly composed of two parts; a condition part and an action part. The condition part lists an expression that tests the occurrence of the event, while the action part describes what actions to be taken once an event is detected.

BNF Grammar

The BNF grammar is a formal notation used to describe the syntax of a language or language construct. It is composed of a number of productions. Each production describes the structure of its left-hand-side component by the right-hand-side component.

The left-hand-side of a production contains a single component classified as a non-terminal entity, while the right-hand-side is composed of one or more components that can be either terminal or non-terminal entities. Each non-terminal entity must be further described by appearing as a left-hand-side of some production. The terminal entities constitute the strings that can be used to form each acceptable construct of the described language. The fact that the left-hand-side is described by the right-hand-side does not exclude recursive definitions as long as the right-hand-side has an alternate that can be used to terminate the recursion.

Notation Description

The following points are provided to help in clarifying the notation used in the grammar:

The string "::=" meaning "is defined as"

The character '|' means "or"

Optional components are enclosed in square brackets ('[', ']').

The following '<', '>', '=', '<>', '>=', '<=', ':' are terminal operators.

The string "STRING" denotes a quoted string and is considered a terminal entity.

All other strings in the grammar are non-terminals.

Each production is preceded by a reference number that is used only to reference the particular production.

The Grammar

The preferred BNF grammar used with the present invention is as follows:

```
1) Event_Monitor_List ::= Event_Monitor_Statement
1) Event_Monitor_List ::= Event_Monitor_Statement Event_Monitor_List
2)                      |[ Event_Monitor_Statement ]
3) Event_Monitor_Statement ::= Event Event_Name Event_Frequency
                                    Event_Body
                                  EndEvent
4) Event_Name     ::= IDENTIFIER
5) Event_Frequency ::= Once
6)                    | Always
7) Event_Body ::=     [ AtTimestep_Statement ]
                      [ AtLayer_Statement ]
                      [ AtWell_Statement ]
                      Event_Expression
                      Event_Clause_List
8) AtTimestep_Statement ::= At_TimeStep ( IndexSpecifier )
9) AtLayer_Statement ::=    At_Layer ( IndexSpecifier )
10) AtWell_Statement ::= At_Well ( Well_Specifier , Number )
11) Well_Specifier ::=       STRING
12)                         | All_Wells
13) Event_Expression ::= Search_Scope Where ( Event_Condition_List )
14) Search_Scope ::=         Find_All
15)                         | Find_Any
16) Event_Condition_List ::=   Or_Condition OR Event_Condition_List
17)                           | Or_Condition
18) OR_Condition ::= And_Condition AND OR_Condition
19)                           | And_Condition
20) And_Condition ::= NOT ( And_Condition )
21)                 |   ( And_Condition )
22)                 |   Simple_Condition
23) Simple_Condition ::=
        ( Gradient PropertyName [ElementSpecifier] CompOpr Value)
24)                 | ( PropertyName [ElementSpecifier] CompOpr Value)
25) ElementSpecifier ::= ( IndexSpecifier , IndexSpecifier , IndexSpecifier )
26) IndexSpecifier ::= IndexRange
27)                   | Number
28) CompOpr ::=         > | < | = | >= | <= | <>
29) Event_Clause_List ::=      Event_Clause Event_Clause_List
30)                           | Event_Clause
31) Event_Clause ::=   Sound_Clause
32)                           | Haptic_Clause
33)                           | Graphics_Clause
34)                           | Message_Clause
35) Sound_Clause ::=  Sound Play ( filename )
36)                           | Sound Talk ( STRING , Event_Location_Info )
37) Haptic_Clause ::=
38) Graphics_Clause ::= Graphics Opacity ( Number )
39) Message_Clause ::= Message ( STRING , Event_Location_Info )
40) Event_Location_Info::=       Cell_Location
41)                             | Well_Name
42)                             | Cell_and_Well_Info
43)                             | None
44) IndexRange ::=    Number : Number
45)                   | :
46) Number ::= Integer
47) Value ::= Real Number
48) filename ::= STRING
```

Non-Terminals

The following is a list of all the non-terminal entities that appear in the proposed grammar:
And_Condition
AtLayer_Statement
AtTimestep_Statement
AtWell_Statement
CompOpr
ElementSpecifier
Event_Body
Event_Clause
Event_Clause_List
Event_Condition_List
Event_Expression
Event_Frequency
Event_Location_Info
Event_Monitor_List
Event_Monitor_Statement
Event_Name
Filename
Graphics_Clause
Haptic_Clause
IndexRange
IndexSpecifier
Message_Clause
Number
OR_Condition
Search_Scope
Simple_Condition
Sound_Clause
Value
Well_Specifier

Terminals (Keywords and Operators)

The following is a list of all the terminal entities (both keywords and operators) that appear in the proposed grammar:
All_Wells
Always
AND
At_Layer
At_TimeStep
At_Well
Cell_and_Well_Info
Cell_Location
EndEvent
Event
Find_All
Find_Any
Gradient
Graphics
Message
None
NOT
Once
Opacity
OR
Play
Sound
Talk
Well_Name
Where
IDENTIFIER: Any Sequence of characters and/or numbers starting with a character
'>', '<', '=', '>=', '<=', '<>', ':'

Integer Numbers
Real Numbers
STRING: Any quoted string

Notes on the Semantics of the Event Monitor Grammar

The event monitor syntax set forth above provides an engineer with a tool to automatically perform interpretation and analysis of reservoir simulation results. The syntax enables the engineer to define a series of rules to quickly interpret data. These rules can be stored and re-applied to updated simulation runs of the same model or serve as template for new simulations on different models. It also provides a knowledge capture capability that engineers can invoke to ease their analysis and give them an understanding of what other engineers have looked for in simulation results.

The immediate use of this Event Monitor is for timestep-by-timestep analysis of simulation results. But exactly the same syntax will be used in more advanced applications, such as:

(a) Scan the entire simulation result for all timesteps in "batch mode" and generate a log of all events occurring; or (b) Work interactively with an on-line (real-time) simulation as it happens.

The Event Monitor grammar productions have been numbered sequentially. The following discussion uses that numbering to explain the less self-apparent entries.

(5, 6): Event Frequency.

The keyword "Once" implies that, once the event happens and triggers a response during a timestep, it will not trigger a response again at a later timestep. The rationale was to avoid undesirable repetitive messages, sounds, etc. when the engineer is already aware that the monitored condition has occurred.

The keyword "Always" implies that the response will be triggered whenever the event happens regardless of whether it has happened before or not.

(8): At_Timestep (IndexRange).

This keyword indicates that the event will be monitored only at the timesteps indicated by a range. The rationale is to provide the engineer with a means to monitor only a portion of the simulation (simulation history period or simulation prediction period, for example).

Example:

At_Timestep(5:10) indicates that the event will be monitored only for timesteps 5, 6, 7, 8, 9 and 10.

(9): At_Layer (IndexRange).

This keyword indicates that the event will be monitored only for the reservoir layers indicated by a range. The rationale is to provide the engineer for a way to concentrate on a vertical region of the reservoir only, such as a gas cap, the oil window or below the oil-water-contact.

Example:

At_Layer (1:10) indicates that the event will be monitored only for layers 1 through 10 inclusive.

(10,11,12): At_Well(Well_Specifier, Number).

This keyword indicates that the event will be monitored only along a specified well or wells. This not only includes the wellbore cell but also a radius around it. The rationale is to provide the engineer with a tool that will pinpoint important changes at and near the wells as the simulation proceeds.

Examples:

At_Well ("Gusher-2",3) means that the cells perforated by well Gusher-2 and 3 cells in a radius around it will be monitored and the rest of the reservoir ignored.

At_Well (All_Wells,3) will monitor the event at all wells without the need for exhaustive enumeration.

At_Well (All_Wells,0) will monitor the event at all wells but only at the cells perforated by the well, without any search radius around it.

(13,14,15): Search_Scope Where (Event_Condition_List).

This production indicates that the event will be monitored only where the event condition holds. In the Search_Scope, the keyword Find_Any means that the action is to be triggered upon its very first occurrence in any cell within the condition search scope, without exploring the remaining cells. The keyword Find_All implies the opposite, i.e., all cells must be inspected and tagged accordingly before any action is triggered. The rationale is to provide a choice of either immediate localized warnings or a map of geobodies formed by the cells that have satisfied this condition.

(23,24): (Gradient PropertyName).

This is a special type of condition where it is not the value of the property itself that is monitored but its gradient, that is, the difference between its current value and its value at the previous timestep. The rationale is to provide the engineers with the capability to monitor a "rate of change" as to advise them of rapidly changing conditions in the reservoir.

(35): Sound Play (filename).

This is a conventional triggered action currently used, where a triggered action implies playing sound from a .wav or .mid file.

(36): Sound Talk (STRING, Event_Location_Info).

This clause will generate voice out of text message built using the provided arguments. The arguments are as follows:

STRING is an arbitrary user defined text string, and Event_Location_Info will dictate what event location information should be appended to the text string.

Examples:

Sound Talk("Event condensate_dropout at cell",Cell_Location)

This would speak out a message like "Event condensate dropout at cell 14,20,5"

Sound Talk("Event condensate_dropout at well", Well_Name)

This would speak out a message like "Event condensate dropout at well Producer-15"

(37): Haptic_Clause is available for possible use as a triggered action.

(38): Graphics Opacity (Number).

This triggered action uses graphics instead of sound. A translucent opacity number (in the argument Number) will be applied to all cells in the reservoir to fade away except those that satisfied the condition, which should be revealed at full strength. The rationale is to direct the attention of the engineer to the specific areas that satisfy the condition so that they are clearly visible in the 3D display, with everything else being visibly diminished or fading into an imperceptible background.

(39): Message (STRING, Event_Location_Info).

This is analogous to production (36) except that, instead of sound, a pop-up window on the computer display becomes the triggered action. This window has a dismiss feature or button or similar functionality to be clicked indicating that the engineer has acknowledged the message.

Example:

Message ("Warning: Event water_breakthrough at cell", Cell_Location)

This would bring up a message box with the text "Warning: Event water_breakthrough at cell 30,40,20"

Using the BNF rule syntax as described above, an engineer can query the state of any of reservoir surveillance variables inside the simulator at any time. FIGS. 9 through 13 are displays of reservoir surveillance variables obtained with the present invention. Examples of BNF syntax rules for the variables shown in these Figures and obtained in the computer as described in the Equations 1-22 as applicable above follow:

Event
Horizontal_Stress Always
Find_All Where (Gradient H_STRESS<0.0)
Sound Talk("Negative Stress Gradient At grid block", Cell_Location)
EndEvent
Event
Uniaxial_Compaction Always
Find_All Where (UNI_COMP>2.0)
Sound Talk("Uniaxial Compaction greater than 2 at grid block", Cell_Location)
Graphics Opacity(0)
EndEvent
Event
Bulk_Density Always
Find_All Where (BULKDENS<2.0)
Sound Talk("Density less than 2 at grid block", Cell_Location)
EndEvent
Event
SOM Always
Find_All Where (SELFMAP<2.0)
Sound Talk("Self Organizing Map Cluster less than 2 at grid block", Cell_Location)
Graphics Opacity(0)
EndEvent
Event
Impedance1 Always
Find_All Where (Gradient P_IMPEDA>5000.0)
Sound Talk("Positive Impedance Gradient at grid block", Cell_Location)
EndEvent
Event
Impedance2 Always
Find_All Where (Gradient P_IMPEDA<0)
Sound Talk("Negative Impedance Gradient at grid block", Cell_Location)
EndEvent In the above examples the "Sound Talk" command passes the text string and the vector containing the cell location to a Text-To-Speech interface such as that provided by Microsoft Corporation, so that a system voice reads the message aloud. The use of voice alerts is particularly helpful during calibration as shown in FIG. 3, since the voice message does not alter the visual display or any direct interactions of the engineer with the data. Microsoft Corporation offers several voice types in any Windows® XP installation. The ones found clearest for use have been those known as "Michael" (male voice) and "Michelle" (female voice).

True speech or voice alerts formed in response to the event monitoring is preferably machine-generated human-like voice. It could also be pre-recorded voice messages based on the alert to be given if desired. The sound representations converted from reservoir variables are different and are based on MIDI musical scales and are thus conceptually and audibly different from human-like voice messages.

Kalman Filtering

The reservoir simulator time step in FIG. 3 is controlled by the reservoir engineers, who can stop/pause the simulator at a given point in time or ask it to advance to the next time step. The field data acquired during surveillance typically has two main characteristics that the engineer is very likely to encounter: the field data will be noisy, or the field data will not arrive at the precise time-step of the simulation.

The first issue is well known in signal processing and the solution here is to apply during step 26 (FIG. 2) a fast-compute filter. Preferably, Kalman Filtering is selected, which has an added advantage because such filtering works as a running least-squares smoother and therefore can be updated as new data arrives without having to re-compute the entire filtered sequence for each new data point.

In the process of reservoir surveillance, it is necessary to estimate, via measurements, the state of a reservoir variable and its uncertainty. However, it is not necessary to directly observe these states. It is necessary only to observe some measurements from an array of sensors, which are noisy. As an additional complication, the states evolve in time, also with its own noise or uncertainties. The Kalman Filter is used to address the question of how one can optimally use the measurements of unobserved variables and their uncertainties.

The power of the Kalman Filter is that it operates on-line. This implies that, to compute the best estimate of a state and its uncertainty, the previous estimates can be updated by the new measurement. Therefore, it is not necessary to consider all the previous data again. In order to compute the optimal estimates, rather, one only needs to consider the estimate from the previous time step and the new measurement. The Kalman Filter is a known computer-implemented signal processing technique widely discussed in the literature, so only those Kalman filtering features as applied in the present invention are discussed herein.

Given an initial noisy data measurement $x_0$ from a monitoring instrument, that measurement is used as a first estimate $y_0$ of the correct value. The error variance of the instrument (or its square root, which is the standard deviation of the error $\sigma_n$) is also known. A value can also be assumed for the initial variance of the estimate, which is self-corrected by the Kalman Filter computation.

For every new time step "t" after the initial one (t=0), the Kalman Filter Gain is computed as:

Equation 18:

$$K_t = \frac{\sigma_t}{\sigma_t^2 + \sigma_n^2}$$

With this Gain, the "updated" estimate of the signal is computed as:

$$y_{u,t} = y_t + K_t(x_t - y_t) \qquad \text{Equation 19}$$

And the "updated" estimate of the variance is computed as:

$$\sigma_{u,t}^2 = (1 - K_t)\sigma_t^2 \qquad \text{Equation 20}$$

Before advancing to the next time step the estimate and the variance to the newly "updated" values, are reset, i.e.:

$$y_{t+1} = y_{u,t} \qquad \text{Equation 21}$$

$$\sigma_{t+1}^2 = \sigma_{u,t}^2 \qquad \text{Equation 22}$$

At this point the process is repeated for the next time step, starting with Equation 18, until a desired or specified amount or level of noise reduction has been achieved.

The issue of arrival time adjustment can be handled in a variety of ways, as long as the field recordings are being retained in disk storage. Since the simulation results are typically retained on disk also, engineers can back-track the simulation to any point in time by using a conventional "re-start" file. The present system then fetches the real-time information from the same time horizon and performs the necessary comparisons.

It is to be noted that because of the different nature of real and simulated data, one is not looking to match absolute values but rather the magnitude of changes in a property. Reservoir monitoring requires only a determination of the change in reservoir conditions from a previous time horizon or step to the present time.

The simulated change is the difference between the monitored variable at two different simulation times (fracture gradient, for example). The actual change is the one computed by subtraction of the actual field measurements at the same two time horizons. If these changes agree, the simulator is used to forecast what the future changes will be. The engineer uses this forecast to determine how best to continue producing the reservoir.

Measurement Technology and Surveillance Variables

The following table shows the correspondence between the continuous measurement technology applied and the variables that the simulator computer 30 uses in matching these changes. The Equation numbers in parentheses in the following table correspond to the equation numbering listed above:

| RESERVOIR MONITORING TECHNOLOGY | VARIABLE SELECTED FOR SURVEILLANCE |
|---|---|
| Microseismic monitoring | Horizontal Stress, Fracture Gradient and Subsidence (Equations 14, 15, 16) |
| Borehole Gravimetry monitoring | Bulk Density (Equation 3) |
| Time-Lapse (4D) Seismic | Acoustic P-Impedance and P-Reflectivity (Equations 8, 10) |
| Multi-component Seismic | Shear S-Impedance and S-Reflectivity (Equations 9, 11) |
| Cross-Well Electromagnetics | True Formation Resistivity (Equation 17) |

Microseismic monitoring technology is unique in the group in the table above in the sense that only micro-earthquakes, and not true rock stress, can be measured in the field. These micro-earthquakes are not a direct measurement of either horizontal stress or fracture gradient or subsidence but, instead, are a signal that some or all of these three mechanisms are actually occurring. Therefore, one compares these tremors with changes in those three variables and determines if a direct correlation exists.

The other reservoir monitoring technologies map directly into reservoir simulation variables. Borehole gravimetry measures density changes. Therefore, the simulator can subtract the densities at the two time horizons to determine change. Gravimetry is useful at tracking water sweeps in gas fields since the density difference between gas and water is large enough to be accurately monitored. Oil fields can even be monitored this way under certain circumstances (although the density contrast between oil and water is not as large).

Time-lapse 4D seismic monitoring measures changes in acoustic impedance and reflectivity over time. Therefore the simulator's petro-elastic model can compute predicted changes in these two variables for comparison. These changes are valuable indicators since the density and velocity of sound propagation in oil, gas and water are all different. This can help determine if one fluid has displaced another during production sweep.

Multi-component seismic monitoring measures changes in shear impedance over time. Therefore the simulator's petro-elastic model during step 24 can compute changes in this variable for comparison. Shear properties are sensitive to the density of the fluid contained therein.

Cross-well electromagnetics monitoring measures changes in true formation resistivity. Therefore the simulator can compute changes in resistivity based on Archie's equation (17) for comparison. Resistivity changes are indicators of hydrocarbon/water front movements since hydrocarbons are electrically resistive while water is not.

Note that not all of the foregoing monitoring technologies are applicable in a given field, as already discussed in the introduction section. It is assumed that once a decision has been made to incur in the expense of continuous monitoring, it is because sufficient modeling has been done in advance to determine that the monitored variable is indeed sensitive to changes in the producing reservoir. Otherwise large sums of money could be spent in installing expensive monitoring hardware without sufficient prior engineering analysis and modeling.

Displays of Monitoring Variables

FIGS. 9 through 13 are images of screen displays of three-dimensional images of certain of the monitoring variables for the same subsurface hydrocarbon reservoir as that of FIGS. 5-8 at a selected depth and during a given time step formed according to the present invention. In the displays of FIGS. 5-13, the reservoir is what is known as a giant reservoir, containing some 3×10" (or 300 billion) cubic meters in volume and composed of some 500,000 cells and nine hydrocarbon components.

Figure 9:
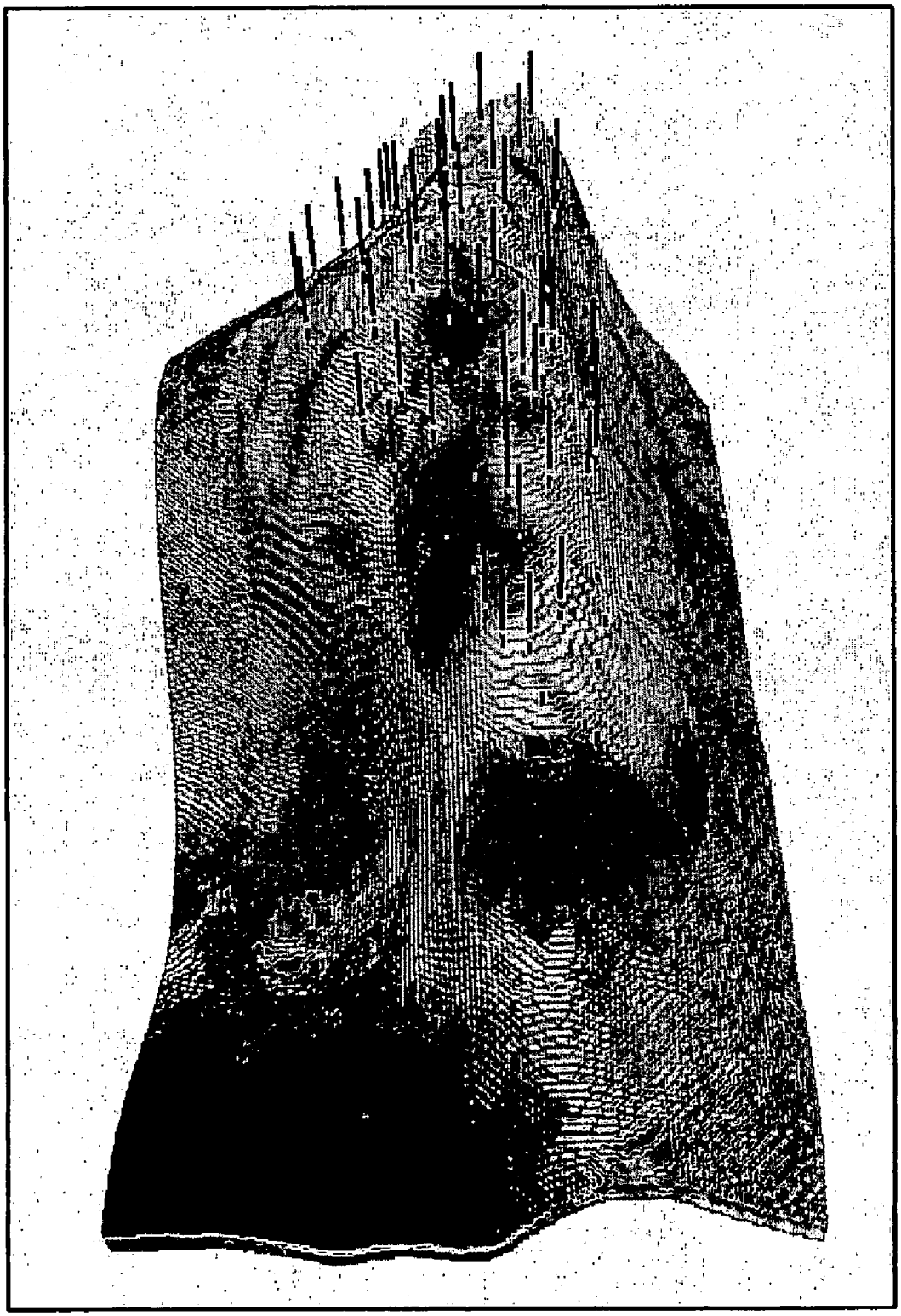
FIGS. 9, 10, 11, 12 and 13 are example display images of monitoring variables formed according to the present invention.
Figure 10:
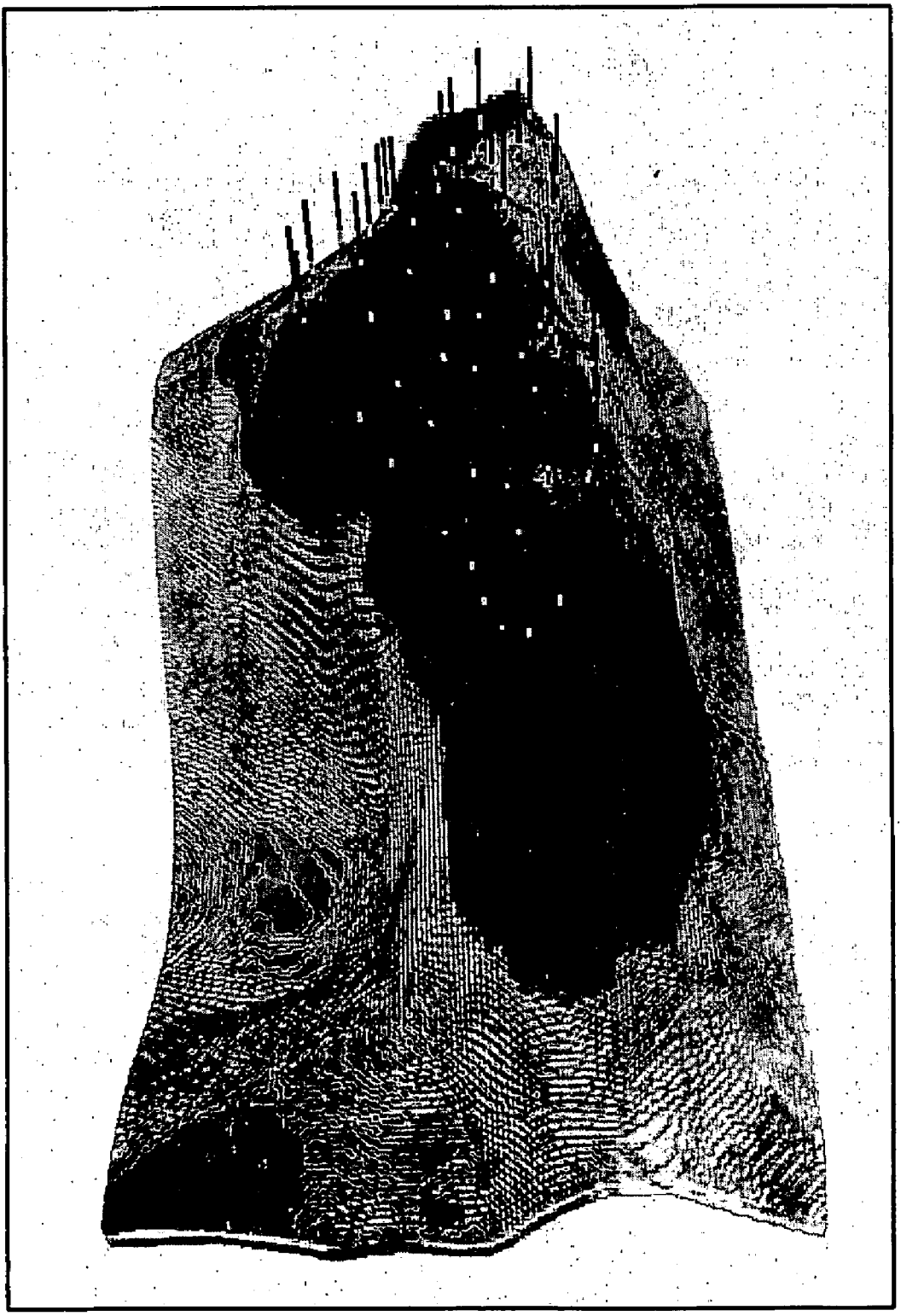
Figure 11:
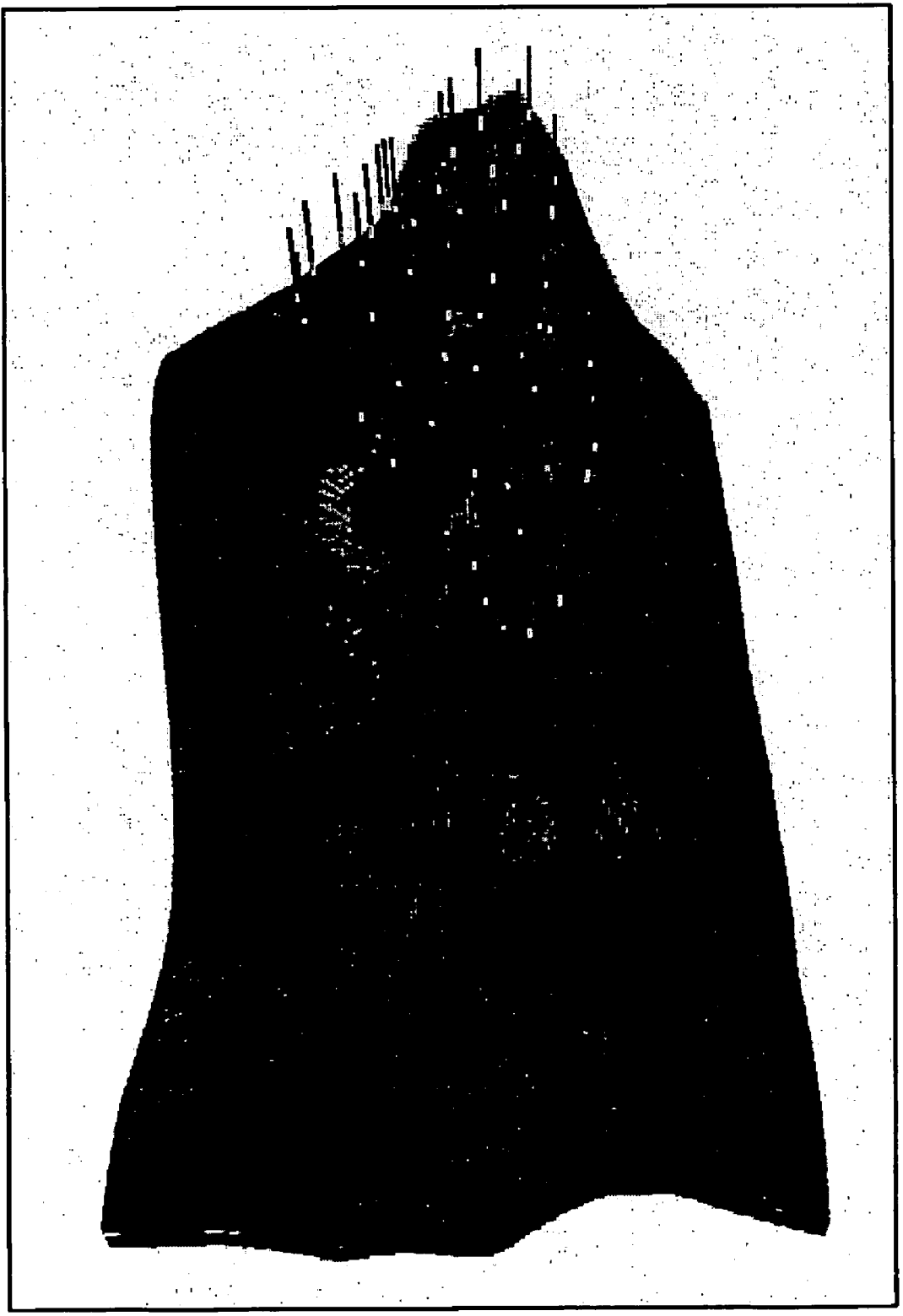
Figure 12:
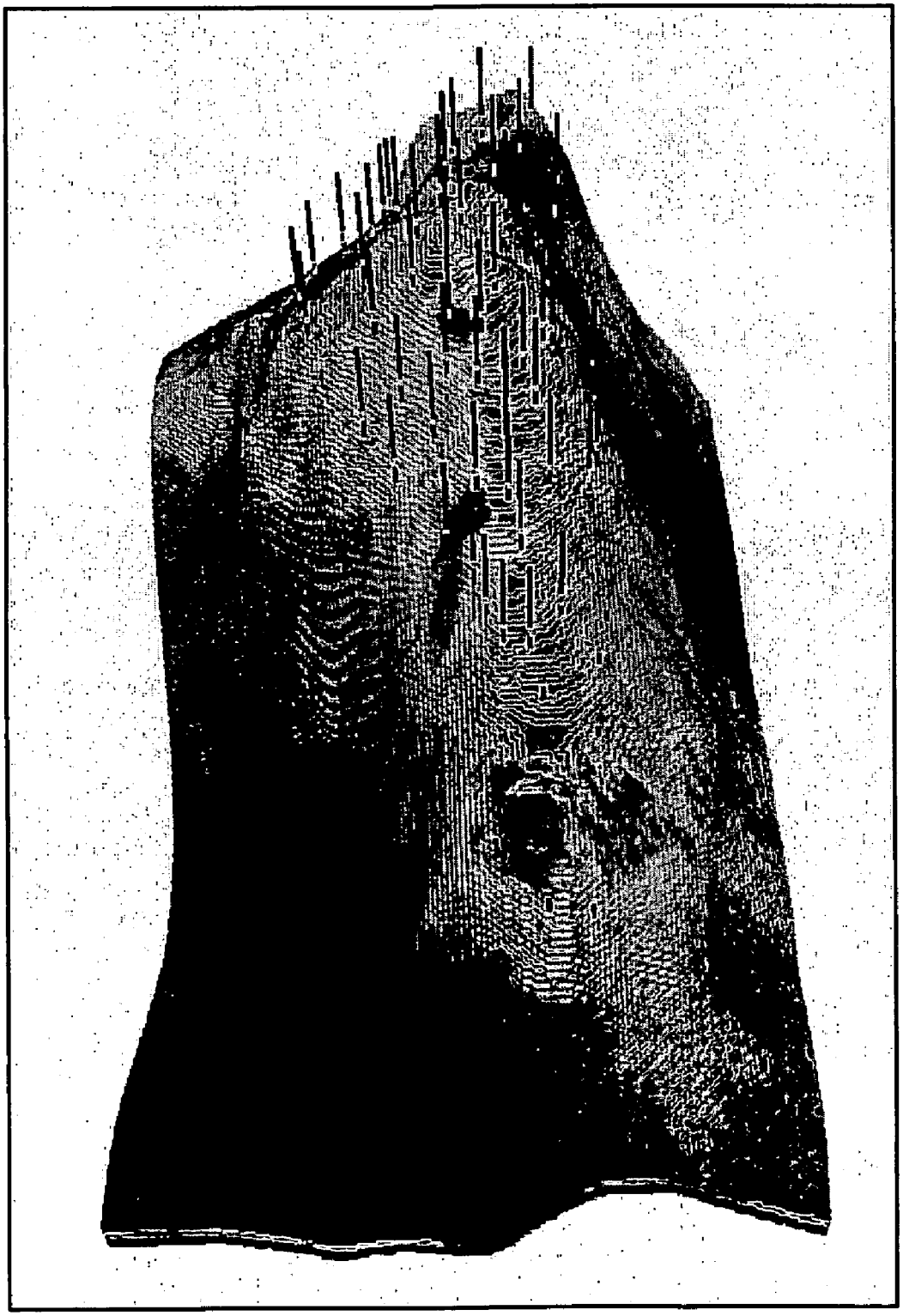
Figure 13:

FIG. 9 is a screen display image of a three-dimensional fracture gradient for the reservoir determined in the petro-elastic model according to Equation 15 above. As has been discussed, fracture gradient is related to microseismic monitoring. FIG. 10 is a screen display image of horizontal stress for the reservoir determined in the petro-elastic model according to Equation 14 above. As has been discussed, horizontal stress is related to microseismic monitoring. FIG. 11 is a screen display image of uniaxial compaction determined in the petro-elastic model according to Equation 16 above. Uniaxial compaction is related to microseismic monitoring. FIG. 12 is a screen display image of bulk density determined in the petro-elastic model according to Equation 3 above. Bulk density is related to borehole gravimetry monitoring. FIG. 13 is a screen display image of P-wave impedance determined in the petro-elastic model according to Equation 3 above. P-wave impedance is related to borehole 4D or time-lapse seismic monitoring.

The fracture gradient display of FIG. 9 is an indication of rock-mechanical changes in the reservoir that may be associated with micro-earthquakes (i.e. microseismic monitoring). The engineer will observe this display in conjunction with the horizontal stress in the reservoir (FIG. 10). And use the rule below to scan for negative changes in horizontal stress (i.e. a decrease in the horizontal stress could indicate that injected water has entered gas-filled rock pores, which were previously being compressed laterally by other fluid-bearing rock).

```
Event
  Horizontal_Stress Always
  At_Well(All_Wells,2)
  Find_All Where (Gradient H_STRESS<0.0)
  Sound Talk("Negative Stress Gradient At Well", Well_Name)
EndEvent
```

The uniaxial compaction display of FIG. 11 is an indicator of rock subsidence. This most likely represents compression of the reservoir due to its own weight by collapsing into vacant pores that were previously occupied by oil, which was depleted due to oil production. This would generate micro-earthquakes that can be sensed by microseismic monitoring. The engineer would set a proper alert monitor by the following rule which is looking for subsidence effects greater than 2 centimeters of vertical rock displacement or collapse:

```
Event
  Well_Uniaxial_Compaction Always
  At_Well(All_Wells,2)
  Find_All Where (UNI_COMP>2.0)
  Sound Talk("Uniaxial Compaction greater than 2 at well", Well_Name)
EndEvent
```

The bulk density display of FIG. 12 is used to observe density changes in the reservoir. These changes, if significant, could be measured by borehole gravimetry. An indication of a positive change (i.e. a gradient greater than zero) reveals that a heavier fluid has displaced a lighter fluid at that location. This typically means that oil has been swept by a water front due to water injection. An event monitor rule would look as follows:

```
Event
  Bulk_Density2 Always
  At_Well(All_Wells,2)
  Find_All Where (Gradient BULKDENS>0.0)
  Sound Talk("Density gradient greater than zero at well",Well_Name)
EndEvent
```

The P-Wave impedance (or acoustic impedance) display of FIG. 13 is useful to track seismic impedance changes due to fluid movement, such as a gas cap evolving from an oil reservoir due to decreased pressure. But it is also useful to track locations where the impedance does not change, which could be indicative of by-passed hydrocarbon that has not been reached by any of the producing wells and therefore suggest a new drilling location. The case of gas cap evolution can be tracked by the following event monitor rule:

```
Event
  Impedance2 Always
  Find_All Where (Gradient P_IMPEDA<0)
  Sound Talk("Negative Impedance Gradient at grid block", Cell_Location)
EndEvent
```

Event Monitor Displays

FIGS. 14-25 are example schematic diagrams of reservoir cells adjacent a well or wells from the reservoir depicted in the data displays of FIGS. 5-13. FIGS. 14-25 illustrate example results of event monitors according to the present invention. FIGS. 14-16 are example diagrams of event monitors according to the rule set forth below:

```
Event CheckPressure Always
At_Layer ( 7 )
Find_All Where ( PRESSURE < 5000 )
Sound Play ( "pr.wav" )
EndEvent
``` which occur at a defined reservoir depth or level for a keyword "Always" as defined above at three different times: $t_1$, $t_2$ and $t_3$ Each of the reservoir cells in the diagrams contains an indication of the following monitored variables: pressure (P); oil saturation (O), and water saturation (W) of processing results in the manner set forth above. For FIGS. 14-16 the syntax rule is that the pore pressure P must not be less than 5000 psia.

FIG. 14 illustrates at time $t_1$ that no alert is triggered because no reservoir cell pressure is less than the defined syntax rule of 5000 psia. FIGS. 15 and 16 show, as indicated by hatching lines in three reservoir cells at each of times $t_2$ and $t_3$ that those three cells exhibit the defined rule condition of the event monitor of pore pressure being less than 5000 psia. At simulation time $t_2$ and $t_3$ in this example an audio or sound alert message is played to indicate a triggered alert and notify the reservoir engineer of the triggered alert.

FIGS. 17 and 18 are example diagrams of event monitors according to the following rule:

```
Event CheckPressure Once
At_Layer ( 7 )
Find_All Where ( PRESSURE < 5000 )
Sound Play ( "pr.wav" )
EndEvent
``` which occur for a keyword "Once" as defined above for the same the sets of reservoir cells as in FIGS. 14-16 at times $t_1$ and $t_2$ a defined syntax rule of 5000 psia. As shown in FIG. 17 no alert is triggered because no reservoir cell pressure is less than the defined syntax rule of 5000 psia. As shown in FIG. 18 by hatching lines in three reservoir cells at time $t_2$, those three cells exhibit the defined rule condition of the event monitor of pore pressure being less than 5000 psia. An appropriate alarm for the reservoir engineer is formed at time $t_2$. Because of the alert at time $t_2$, and due to the keyword "Once", no alert is triggered at time $t_3$.

FIG. 19 is an example diagram of an event monitor according to the rule set forth below:

```
Event CheckPressure_and_watersat Always
At_Layer ( 7 )
Find_All Where ( ( PRESSURE < 5180 )
AND ( SWAT > 0.0) )
Sound Play ( "pr.wav" )
Sound Play ( "wa.wav" )
EndEvent
``` which occurs for the keyword "Always" as defined above for the same the sets of reservoir cells as in FIGS. 14-16 and for a composite syntax rule that: (1) pore pressure should not be less than 5180 psia and (2) water saturation should be some positive value greater than zero. As shown in FIG. 19 by hatching lines in three reservoir cells at time $t_3$, those three cells exhibit the defined composite syntax rule condition and a sound alert of the presence of each of the defined rule conditions at those three cells is made. As shown in the diagrams of FIGS. 14 and 15, the composite syntax rules are not met by the cells displayed in these Figures and no alert is triggered at times $t_1$ and $t_2$.

FIG. 20 is an example diagram of an event monitor according to the rule set forth below:

```
Event CheckPressure_and_watersat_at_range Always
At_Layer ( 7 )
Find_All Where (( PRESSURE (1:3, 2:4 , : ) < 5180 )
AND ( SWAT( 1:3 , 2:4, : ) > 0.05 ))
Sound Play ( "section.wav" )
EndEvent
``` which occurs for the keyword "Always" as defined but only for cells in the range 1 to 3 in the x-direction, 2 to 4 in the y-direction for a composite syntax rule that: (1) pore pressure should not be less than 5180 psia and (2) water saturation should be greater than 0.05. As shown in FIG. 19 by hatching lines in three reservoir cells at time $t_3$, those three cells exhibit the defined composite syntax rule condition and a sound alert of the presence of each of the defined rule conditions at those three cells is made. As shown in the diagrams of FIGS. 14 and 15, the composite syntax rules are not met by the cells displayed in these Figures and no alert is triggered at times $t_1$ and $t_2$.

FIG. 21 is an example plan diagram and FIG. 22 is a vertical cross-section diagram of the reservoir of an event monitor which occurs for the keyword "Always" applied at wells only (plus one cell neighboring the well) as defined above for a composite syntax rule that: (1) pore pressure should not be less than 5180 psia and (2) oil saturation should be greater than 0.05. As shown in FIG. 21, only the well cells and the immediate neighboring cells trigger an alarm in this case. Notice that this trigger applies to all layers from top to bottom (i.e. all well perforations) as shown in the cross-section in FIG. 22.

FIGS. 23, 24 and 25 are example diagrams of event monitors which occur for a keyword "Always" as defined above for the same the sets of reservoir cells as in FIGS. 14-16 at times $t_1$, $t_2$ and $t_3$ a defined syntax rule of a pressure gradient of less than a negative 200 psia. As shown in FIG. 23 no alert is triggered because no pressure gradient meets the defined syntax rule. As shown in FIG. 24 by hatching lines in a single reservoir cell at time $t_2$, that cells exhibit the defined rule condition of the event monitor of defined pressure gradient an alert is triggered. As shown in FIG. 25 by matching lines, a total of three cells will trigger the prescribed alarm at time $t_3$.

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined structure, or in the manufacturing process of the same, requires the claimed matter in the following claims; such structures shall be covered within the scope of the invention.

It should be noted and understood that there can be improvements and modifications made of the present invention described in detail above without departing from the spirit or scope of the invention as set forth in the accompanying claims.

What is claimed is:

1. A computer-implemented method of calibrating a computerized reservoir model based on actual reservoir monitoring measurements obtained from a subsurface hydrocarbon reservoir, comprising the steps of:

generating in a computer numerical predictions of reservoir variables in the computerized reservoir model indicating predicted fluid and rock properties of the reservoir;

converting the generated numerical reservoir variable predictions into predicted sound sequences indicative of the generated numerical reservoir variable predictions;

storing in the computer data values representing the predicted sound sequences indicative of the generated numerical change predictions;

converting actual reservoir monitoring measurements into actual sound sequences indicative of the actual reservoir monitoring measurements;

storing in the computer data values representing the actual sound sequences;

playing the predicted sound sequences and the actual sound sequences; and interactively comparing the predicted sound sequences and the actual sound sequences at a selected time step to determine if adjustments in the computerized reservoir model are necessary.

2. The computer-implemented method of claim 1, further including the step of:

correcting the occurrence time of events indicative of changes in the fluid and rock properties of the computerized reservoir model predicted sound sequences and actual sound sequences to align the events in time.

3. The computer-implemented method of claim 1, further including the step of:

correcting the amplitude levels of events indicative of changes in the fluid and rock properties of the reservoir in the predicted sound sequences and actual sound sequences to equalize the magnitude of the events.

4. The computer-implemented method of claim 1, further including the step of:

applying Kalman filtering to the predicted sound sequences and actual sound sequences to minimize drift between the events.

5. The computer-implemented method of claim 1, further including the step of:

repeating the step of playing the predicted sound sequences and the actual sound sequences for other time steps.

6. The computer-implemented method of claim 5, wherein at least one of the other time steps is earlier than the selected time step.

7. The computer-implemented method of claim 5, wherein at least one of the other time steps is later than the selected time step.

8. The computer-implemented method of claim 1, further including the step of:

introducing changes in the computerized reservoir model based on the results of the step of interactively comparing.

9. The computer-implemented method of claim 1, further including the steps of:

digitally cross-correlating the predicted sound sequence and the actual sound sequence to determine the time shift correction needed and the gain or scale factor needed to equalize the magnitude of the predicted and actual renditions of a selected portion of the reservoir;

interactively introducing changes in the computerized reservoir model to match the actual reservoir monitoring measurements; and repeating the steps of digitally cross-correlating and interactively introducing changes over a number of time windows of data until results of the digital cross-correlation and the interactive comparison of sound sequences are acceptable.

10. The computer-implemented method of claim 1, wherein the reservoir monitoring measurements comprise:
microseismic monitoring measurements.

11. The computer-implemented method of claim 1, wherein the reservoir monitoring measurements comprise:
borehole gravimetry monitoring measurements.

12. The computer-implemented method of claim 1, wherein the reservoir monitoring measurements comprise:
time-lapse seismic monitoring measurements.

13. The computer-implemented method of claim 1, wherein the reservoir monitoring measurements comprise:
multi-component seismic monitoring measurements.

14. The computer-implemented method of claim 1, wherein the reservoir monitoring measurements comprise:
cross-well electromagnetic monitoring measurements.

15. The computer-implemented method of claim 1, wherein the computer numerical predictions of reservoir variables include a reservoir surveillance variable.

16. The computer implemented method of claim 15, wherein the reservoir surveillance variable comprises:
bulk density.

17. The computer implemented method of claim 15, wherein the reservoir surveillance variable comprises:
P-wave impedance.

18. The computer implemented method of claim 15, wherein the reservoir surveillance variable comprises:
P-wave reflectivity.

19. The computer implemented method of claim 15, wherein the reservoir surveillance variable comprises;
S-wave impedance.

20. The computer implemented method of claim 15, wherein the reservoir surveillance variable comprises:
S-wave reflectivity.

21. The computer implemented method of claim 10, wherein the reservoir surveillance variable comprises:
horizontal stress.

22. The computer implemented method of claim 10, wherein the reservoir surveillance variable comprises:
fracture gradient.

23. The computer implemented method of claim 10, wherein the reservoir surveillance variable comprises:
true formation resistivity.

24. The computer implemented method of claim 1, wherein the reservoir volume is partitioned into a number of individual three-dimensional cells.

25. The computer implemented method of claim 24, wherein the step of generating predicted values of properties of fluids comprises the step of:

generating a measure of the pressure in the individual cells of the reservoir.

26. The computer implemented method of claim 25, wherein the step of generating predicted values of properties of fluids comprises the step of:

generating a measure of the oil saturation in the individual cells of the reservoir.

27. The computer implemented method of claim 25, wherein the step of generating predicted values of properties of fluids comprises the step of:

generating a measure of the gas saturation in the individual cells of the reservoir.

28. The computer implemented method of claim 25, wherein the step of generating predicted values of properties of fluids comprises the step of:

generating a measure of the water saturation in the individual cells of the reservoir.

29. The computer implemented method of claim 25, wherein the step of generating predicted values of properties of fluids comprises the step of:

generating a measure of the mole fraction compositions in the individual cells of the reservoir.

30. The computer implemented method of claim 25, wherein the step of generating numerical predictions of reservoir variables is performed over a projected production life of the subsurface hydrocarbon reservoir.

31. The computer implemented method of claim 25, wherein the step of generating numerical predictions of reservoir variables is performed over a range of times during a projected production life of the subsurface hydrocarbon reservoir.

32. The computer-implemented method of claim 1, further including the step of:

applying event monitoring rules to the generated numerical predictions of reservoir variables to detect whether specified event monitoring conditions are present at locations in the reservoir.

33. The computer implemented method of claim 24, wherein the event monitoring rules comprise a set of syntax rules relating to reservoir conditions.

34. The computer implemented method of claim 24 wherein the syntax rules of the event monitoring rules are composed in Backus Naur Form grammar.

35. The computer implemented method of claim 33, wherein the set of syntax rules include a syntax rule relating to a reservoir surveillance variable.

36. The computer implemented method of claim 33, wherein the set of syntax rules include a syntax rule relating to a plurality of reservoir surveillance variables.

37. The computer implemented method of claim 33, wherein the set of syntax rules include a syntax rule relating to pressure in the individual cells of the reservoir.

38. The computer implemented method of claim 33, wherein the set of syntax rules include a syntax rule relating to gas saturation in the individual cells of the reservoir.

39. The computer implemented method of claim 33, wherein the set of syntax rules include a syntax rule relating to water saturation in the individual cells of the reservoir.

40. The computer implemented method of claim 33, wherein the set of syntax rules include a syntax rule relating to data-mined byproducts of reservoir surveillance variables.

41. The computer implemented method of claim 1, further including the step of storing the results of the step of generating predicted values.

42. A data processing system for calibrating a computerized reservoir model based on actual reservoir monitoring measurements obtained from a subsurface hydrocarbon reservoir, comprising:

a processor for performing the steps of:
generating numerical predictions of reservoir variables in the computerized reservoir model indicating predicted fluid and rock properties of the reservoir;
convening the generated numerical reservoir variable predictions into predicted digital sound sequences indicative of the generated numerical reservoir variable predictions;
storing the predicted digital sound sequences indicative of the generated numerical change predictions;
convening actual reservoir monitoring measurements into actual digital sound sequences indicative of the actual reservoir monitoring measurements;
storing the actual digital sound sequences;
interactively comparing the predicted digital sound sequences and the actual digital sound sequences at a selected time step to determine if adjustments in the computerized reservoir model are necessary;
a memory for storing the results of the steps of storing; and
a computer audio output for playing audio versions of the predicted digital sound sequences and the actual digital sound sequences.

43. The data processing system of claim 42, wherein the reservoir volume is partitioned into a number of individual three-dimensional cells.

44. The data processing system of claim 42, wherein the processor further performs the step of:

correcting the occurrence time of events indicative of changes in the fluid and rock properties of the computerized reservoir model predicted sound sequences and actual sound sequences to align the events in time.

45. The data processing system of claim 42, further wherein the processor further performs the step of:

correcting the amplitude levels of events indicative of changes in the fluid and rock properties of the reservoir in the predicted sound sequences and actual sound sequences to equalize the magnitude of the events.

46. The data processing system of claim 42, further wherein the processor further performs the step of:

applying Kalman filtering to the predicted sound sequences and actual sound sequences to minimize drift between the events.

47. The data processing system of claim 42, further wherein the processor further performs the step of:

repeating the step of comparing the predicted sound sequences and the actual sound sequences for other time steps than the selected time step.

48. The data processing system of claim 42, further wherein the processor further performs the step of:

introducing changes in the computerized reservoir model based on the results of the step of interactively comparing.

49. The data processing system of claim 42, further wherein the processor further performs the step of:

digitally cross-correlating the predicted sound sequence and the actual sound sequence to determine the time shift correction needed and the gain or scale factor needed to equalize the magnitude of the predicted and actual renditions of a selected portion of the reservoir;
interactively introducing changes in the computerized reservoir model to match the actual reservoir monitoring measurements; and
repeating the steps of digitally cross-correlating and interactively introducing changes over a number of time windows of data until results of the digital cross-correlation and the interactive comparison of sound sequences are acceptable.

50. The data processing system of claim 42, wherein the reservoir monitoring measurements comprise:
microseismic monitoring measurements.

51. The data processing system of claim 42, wherein the reservoir monitoring measurements comprise:
borehole gravimetry monitoring measurements.

52. The data processing system of claim 42, wherein the reservoir monitoring measurements comprise:
time-lapse seismic monitoring measurements.

53. The data processing system of claim 42, wherein the reservoir monitoring measurements comprise:
multi-component seismic monitoring measurements.

54. The data processing system of claim 42, wherein the reservoir monitoring measurements comprise:
cross-well electromagnetic monitoring measurements.

55. The data processing system of claim 42, wherein the computer numerical predictions of reservoir variables include a reservoir surveillance variable.

56. The data processing system of claim 55 wherein the reservoir surveillance variable comprises:
bulk density.

57. The data processing system of claim 55 wherein the reservoir surveillance variable comprises:
P-wave impedance.

58. The data processing system of claim 55 wherein the reservoir surveillance variable comprises:
P-wave reflectivity.

59. The data processing system of claim 55 wherein the reservoir surveillance variable comprises:
S-wave impedance.

60. The data processing system of claim 55 wherein the reservoir surveillance variable comprises:
S-wave reflectivity.

61. The data processing system of claim 55 wherein the reservoir surveillance variable comprises:
horizontal stress.

62. The data processing system of claim 55 wherein the reservoir surveillance variable comprises:
fracture gradient.

63. The data processing system of claim 55 wherein the reservoir surveillance variable comprises:
true formation resistivity.

64. The data processing system of claim 42, wherein the reservoir volume is partitioned into a number of individual three-dimensional cells.

65. The data processing system of claim 64, wherein the predicted values of properties of fluids generated by the processor comprise:
a measure of the pressure in the individual cells of the reservoir.

66. The data processing system of claim 65, wherein the predicted values of properties of fluids generated by the processor comprise:
a measure of the oil saturation in the individual cells of the reservoir.

67. The data processing system of claim 65, wherein the predicted values of properties of fluids generated by the processor comprise:
a measure of the gas saturation in the individual cells of the reservoir.

68. The data processing system of claim 65, wherein the predicted values of properties of fluids generated by the processor comprise:
a measure of the water saturation in the individual cells of the reservoir.

69. The data processing system of claim 65, wherein the predicted values of properties of fluids generated by the processor comprise:
a measure of the mole fraction compositions in the individual cells of the reservoir.

70. The data processing system of claim 65, wherein the numerical predictions of reservoir variables generated by the processor are generated over a range of times during a projected production life of the subsurface hydrocarbon reservoir.

71. The data processing system of claim 65, wherein the numerical predictions of reservoir variables generated by the processor are generated over a projected production life of the subsurface hydrocarbon reservoir.

72. The data processing system of claim 42, wherein the processor further performs the step of:
applying event monitoring rules to the generated numerical predictions of reservoir variables to detect whether specified event monitoring conditions are present at locations in the reservoir.

73. The data processing system of claim 72, wherein the event monitoring rules applied by this processor comprise a set of syntax rules relating to reservoir conditions.

74. The data processing system of claim 73 wherein the syntax rules of the event monitoring rules are composed in Backus Naur Form grammar.

75. The data processing system of claim 73, wherein the set of syntax rules include a syntax rule relating to a reservoir surveillance variable.

76. The data processing system of claim 73, wherein the set of syntax rules include a syntax rule relating to a plurality of reservoir surveillance variables.

77. The data processing system of claim 73, wherein the set of syntax rules include a syntax rule relating to pressure in the individual cells of the reservoir.

78. The data processing system of claim 73, wherein the set of syntax rules include a syntax rule relating to gas saturation in the individual cells of the reservoir.

79. The data processing system of claim 73, wherein the set of syntax rules include a syntax rule relating to water saturation in the individual cells of the reservoir.

80. The data processing system of claim 73, wherein the set of syntax rules include a syntax rule relating to oil saturation in the individual cells of the reservoir.

81. The data processing system of claim 73, wherein the set of syntax rules include a syntax rule relating to data-mined byproducts of reservoir surveillance variables.

82. The data processing system of claim 42, wherein the processor further performs the step of storing the generated predicted values in the memory.

83. A computer program stored in signal bearing media for causing a data processor to calibrate a computerized reservoir model based on actual reservoir monitoring measurements obtained from a subsurface hydrocarbon reservoir the computer program product containing instructions stored in machine-readable code and causing the processor to perform the following steps of:
generating numerical predictions of reservoir variables in the computerized reservoir model indicating predicted fluid and rock properties of the reservoir;
converting the generated numerical reservoir variable predictions into predicted sound sequences indicative of the generated numerical reservoir variable predictions;
storing the predicted sound sequences indicative of the generated numerical change predictions;

converting actual reservoir monitoring measurements into actual sound sequences indicative of the actual reservoir monitoring measurements;

storing the actual sound sequences;

playing the predicted sound sequences and the actual sound sequences; and interactively comparing the predicted sound sequences and the actual sound sequences at a selected time step to determine if adjustments in the computerized reservoir model are necessary.

84. The computer program product of claim 83, wherein the code instructions further include instructions which cause the processor to perform the step of:

correcting the occurrence time of events indicative of changes in the fluid and rock properties of the computerized reservoir model predicted sound sequences and actual sound sequences to align the events in time.

85. The computer program product of claim 83, wherein the code instructions further include instructions which cause the processor to perform the step of:

correcting the amplitude levels of events indicative of changes in the fluid and rock properties of the reservoir in the predicted sound sequences and actual sound sequences to equalize the magnitude of the events.

86. The computer program product of claim 83, wherein the code instructions further include instructions which cause the processor to perform the step of:

applying Kalman filtering to the predicted sound sequences and actual sound sequences to minimize drift between the events.

87. The computer program product of claim 83, wherein the code instructions further include instructions which cause the processor to perform the step of:

repeating the step of playing the predicted sound sequences and the actual sound sequences for other time steps.

88. The computer program product of claim 83, wherein the code instructions further include instructions which cause the processor to perform the step of:

introducing changes in the computerized reservoir model based on the results of the step of interactively comparing.

89. The computer program product of claim 83, wherein the code instructions further include instructions which cause the processor to perform the step of:

digitally cross-correlating the predicted sound sequence and the actual sound sequence to determine the time shift correction needed and the gain or scale factor needed to equalize the magnitude of the predicted and actual renditions of a selected portion of the reservoir;

interactively introducing changes in the computerized reservoir model to match the actual reservoir monitoring measurements; and repeating the steps of digitally cross-correlating and interactively introducing changes over a number of time windows of data until results of the digital cross-correlation and the interactive comparison of sound sequences are acceptable.

90. The computer program product of claim 83, wherein the reservoir monitoring measurements comprise:

microseismic monitoring measurements.

91. The computer program product of claim 83, wherein the reservoir monitoring measurements comprise:

borehole gravimetry monitoring measurements.

92. The computer program product of claim 83, wherein the reservoir monitoring measurements comprise:

time-lapse seismic monitoring measurements.

93. The computer program product of claim 83, wherein the reservoir monitoring measurements comprise:

multi-component seismic monitoring measurements.

94. The computer program product of claim 83, wherein the reservoir monitoring measurements comprise:

cross-well electromagnetic monitoring measurements.

95. The computer program product of claim 83, wherein the computer numerical predictions of reservoir variables include a reservoir surveillance variable.

96. The computer program product of claim 83, wherein the reservoir surveillance variable comprises:

bulk density.

97. The computer program product of claim 83, wherein the reservoir surveillance variable comprises:

P-wave impedance.

98. The computer program product of claim 83, wherein the reservoir surveillance variable comprises:

P-wave reflectivity.

99. The computer program product of claim 83, wherein the code instructions for one step of generating predicted values of properties of fluids cause the processor to perform the step of:

generating a measure of the saturation in the individual cells of the reservoir.

100. The computer program product of claim 83, wherein the code instructions for one step of generating predicted values of properties of fluids cause the processor to perform the step of:

generating a measure of the mole fraction composition in the individual cells of the reservoir.

101. The computer program product of claim 83, wherein the code instructions for one step of generating predicted values of properties of fluids cause the processor to perform the step of:

applying event monitoring rules to the generated numerical predictions of reservoir variables to detect whether specific event monitoring conditions are present at locations in the reservoir.

* * * * *

UNITED STATES PATENT AND TRADEMARK OFFICE
CERTIFICATE OF CORRECTION

| | |
|---|---|
| PATENT NO. | : 7,620,534 B2 |
| APPLICATION NO. | : 11/414566 |
| DATED | : November 17, 2009 |
| INVENTOR(S) | : Pita et al. |

It is certified that error appears in the above-identified patent and that said Letters Patent is hereby corrected as shown below:

Column 30, line 7, delete "convening" and replace with "converting"

Column 30, line 13, delete "convening" and replace with "converting"

Signed and Sealed this

Sixteenth Day of March, 2010

David J. Kappos
*Director of the United States Patent and Trademark Office*